US007830812B2

(12) United States Patent
Atkins et al.

(10) Patent No.: US 7,830,812 B2
(45) Date of Patent: Nov. 9, 2010

(54) MONITORING SYSTEM FOR A MOBILE COMMUNICATION NETWORK FOR TRAFFIC ANALYSIS USING A HIERARCHIAL APPROACH

(75) Inventors: Jeffrey Blair Atkins, Reston, VA (US); Robert William Albert Dobson, Chiswick (GB)

(73) Assignee: Actix Limited, Hammersmith (GB)

( * ) Notice: Subject to any disclaimer, the term of this patent is extended or adjusted under 35 U.S.C. 154(b) by 635 days.

(21) Appl. No.: 10/587,462

(22) PCT Filed: Jan. 27, 2004

(86) PCT No.: PCT/GB2004/000262

§ 371 (c)(1),
(2), (4) Date: Jun. 26, 2007

(87) PCT Pub. No.: WO2005/071890

PCT Pub. Date: Aug. 4, 2005

(65) Prior Publication Data

US 2007/0280123 A1 Dec. 6, 2007

(51) Int. Cl.
*H04L 12/26* (2006.01)
(52) U.S. Cl. .................... 370/252; 370/465; 370/474; 709/224
(58) Field of Classification Search ................. 370/325; 709/224
See application file for complete search history.

(56) References Cited

U.S. PATENT DOCUMENTS

| 7,016,951 | B1* | 3/2006 | Longworth et al. ......... 709/224 |
| 7,301,910 | B2* | 11/2007 | Freedman .................. 370/252 |
| 2002/0105911 | A1 | 8/2002 | Pruthi et al. |
| 2002/0163934 | A1* | 11/2002 | Moore et al. ............... 370/465 |
| 2003/0187977 | A1* | 10/2003 | Cranor et al. .............. 709/224 |

FOREIGN PATENT DOCUMENTS

| WO | WO 00/68811 A | 11/2000 |
| WO | WO 02/088968 A | 11/2002 |

OTHER PUBLICATIONS

International Search Report for corresponding PCT/GB2004/000262 completed Oct. 29, 2004 by W. Wolf of the EPO.

* cited by examiner

*Primary Examiner*—Jason E Mattis
*Assistant Examiner*—Maria Sekul

(57) ABSTRACT

This invention relates to systems, methods and computer program code for testing, troubleshooting and evaluation of mobile phone network. We describe a method of processing network data which includes a plurality of session related parameters. The method comprises inputting one or more queries, a query defining a statistic relating to said parameters and to be computed from said network data, formatting a query to define said statistic in terms of one or more intermediate statistics from which said statistic is computable, operating with said formatted query to determine said one or more intermediate statistics, and storing these in a data store for analysis, preferably indexed by said parameters. Preferably entries for the parameters are stored at time positions in a data pipe.

15 Claims, 20 Drawing Sheets

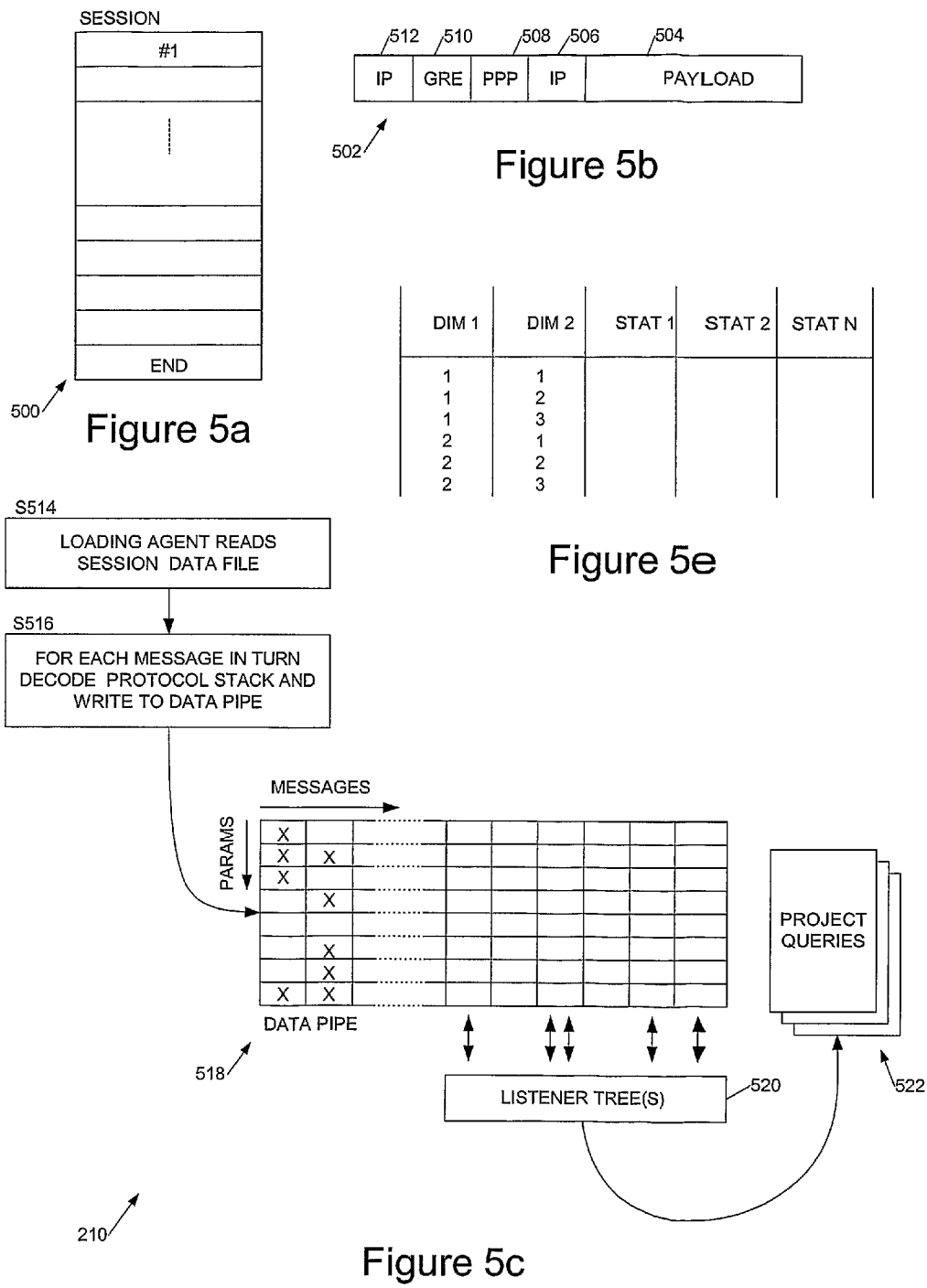

| Time | Origination Time | Packet Data Setup Time | PPP Setup Time | SCH Assignment Time | Total Setup Time |
|---|---|---|---|---|---|
| 1:31:02 PM | 1101 | 127 | 1097 | 4001 | 10179 |
| 1:55:23 PM | 2102 | 141 | 1213 | 398 | 6359 |
| 2:02:52 PM | 292 | 112 | 980 | 1121 | 10718 |
| 3:13:11 PM | 5102 | 202 | 2003 | 906 | 8213 |

Figure 12

| Metric | Goal | Actual |
|---|---|---|
| Average Ec/Io | -14db or better | -7.21 |
| Average Forward FER | 2% or less | 1.49 |
| Average Reverse FER | 2% or less | 2.10 |
| % Access Failure | 0% | 10.71% |
| % Successful Call Origination | >=90% for Mobile Originating or Mobile Terminating Calls | 82.14% |
| % Dropped Calls (of calls that originated successfully) | 2% or less | 7.14% |

Figure 13

| | # TCP Retransmissions | # TCP Aborts | # TCP Transmission Timeouts | # TCP Packets Lost |
|---|---|---|---|---|
| Total (27565 Samples) | 2218 | 98 | 240 | 2040 |
| 8473724068 (124) | 9 | 11 | 1 | 8 |
| 7149264650 (256) | 27 | 8 | 7 | 23 |
| 8474775346 (13) | 0 | 7 | 0 | 0 |
| 6306602110 (70) | 3 | 6 | 7 | 2 |
| 7208404403 (536) | 83 | 6 | 6 | 81 |
| 2039813997 (269) | 99 | 5 | 3 | 96 |

| CDM... | CDMA IMSI | CDMA BSID | Application | Ave. Core Network Delay [s] | Ave. Radio Network D... ▼ | Occurenc |
|---|---|---|---|---|---|---|
| 3192 | 1727472741 04262 | 180388823178 | www-http | 44.2309 | 138.074 | 2685 |
| 3009 | 1727472741 04262 | 180388823178 | www-http | 1.84581 | 36.431 | 4711 |
| 2266 | 1727472741 04262 | 180388823178 | www-http | 0.042 | 31.4985 | 2044 |
| 2526 | 1727472741 04262 | 180388823206 | www-http | 1.81822 | 2.61666 | 4663 |
| 2296 | 1727472741 04262 | 180388823178 | www-http | 1.36825 | 2.30019 | 3945 |
| 2760 | 1727472741 04262 | 180388823206 | www-http | 2.17648 | 1.86458 | 3224 |
| 2291 | 1727472741 04262 | 180388823178 | pop3 | no data | no data | 119 |

Figure 15d

| | MIP Registration Reply Code | IMSI | User ID |
|---|---|---|---|
| ▼ Total (42 Samples) | | | |
| 9/11/2002 3:01:17 PM [2] | Error code from the Foreign Agent - unknown challenge | 5302093549 | sbostain01@spr |
| 9/11/2002 2:58:55 PM [2] | Error code from the Foreign Agent - home agent port unreachable (ICMP error received) | 8474452581 | snelson88@spr |
| 9/11/2002 2:59:38 PM [4] | Error code from the Foreign Agent - mobile node failed authentication | 8474521587 | mark2cool@spr |
| 9/11/2002 3:00:43 PM [2] | Error code from the Foreign Agent - unknown challenge | 8475309339 | ljacobs656@spr |
| 9/11/2002 3:00:42 PM [2] | Error code from the Foreign Agent - mobile node failed authentication | 3123990163 | 5D42889D@hc |
| 9/11/2002 2:59:59 PM [2] | Error code from the Foreign Agent - unknown challenge | 3123990163 | 5D42889D@hc |
| | Error code from the Foreign Agent - stale challenge | 3123993627 | rdekker01@spr |

Figure 16

| Msg No. | Absolute | Relative | Toffset | Message | RRC Cause | Layer 3 | Events |
|---|---|---|---|---|---|---|---|
| 000652 | 12:28:57.003 | 00:01:41.008 | 000000 | BCCH-BCH SysInfoType1 | | | |
| 000653 | 12:28:57.008 | 00:01:41.008 | 000000 | BCCH-BCH SysInfoType7 | | | |
| 000669 | 12:29:00.152 | 00:01:44.152 | 003144 | UL-CCCH RRCConnectionRequest | RRC_registration | | |
| 000683 | 12:29:03.267 | 00:01:47.267 | 003115 | UL-CCCH RRCConnectionRequest | RRC_registration | | |
| 000687 | 12:29:03.698 | 00:01:47.698 | 000431 | DL-CCCH RRCConnectionSetup | | | |
| 000688 | 12:29:04.318 | 00:01:48.318 | 000620 | UL-DCCH RRCConnectionSetupComplete | | | |
| 000693 | 12:29:04.679 | 00:01:48.679 | 000361 | UL-DCCH InitialDirectTransfer | | GPRS MM Attach request | |
| 000694 | 12:29:04.679 | 00:01:48.679 | 000000 | | | GPRS MM Attach request | |
| 000695 | 12:29:04.959 | 00:01:48.959 | 000280 | DL-DCCH DownlinkDirectTransfer | | GPRS MM Attach Accept | |
| 000696 | 12:29:04.959 | 00:01:48.959 | 000000 | | | GPRS MM Attach Accept | |
| 000697 | 12:29:04.969 | 00:01:48.969 | 000010 | UL-DCCH UplinkDirectTransfer | | GPRS MM Attach complete | GPRS Attach Successful |
| 000698 | 12:29:04.969 | 00:01:48.969 | 000000 | | | GPRS MM Attach complete | |
| 000712 | 12:29:07.874 | 00:01:51.874 | 002905 | DL-DCCH UplinkDirectTransfer | | GPRS SM Activate PDP Context request | |
| 000713 | 12:29:07.874 | 00:01:51.874 | 000000 | | | GPRS SM Activate PDP Context request | |
| 000714 | 12:29:08.524 | 00:01:52.524 | 000650 | DL-DCCH RadioBearerSetup | | | |
| 000715 | 12:29:08.565 | 00:01:52.565 | 000041 | UL-DCCH RadioBearerSetupComplete | | | |
| 000720 | 12:29:08.835 | 00:01:52.835 | 000270 | DL-DCCH MeasurementControl | | | |
| 000721 | 12:29:09.055 | 00:01:53.055 | 000220 | DL-DCCH DownlinkDirectTransfer | | GPRS SM Activate PDP Context accept | GPRS PDP Context Activation Successful |
| 000722 | 12:29:09.055 | 00:01:53.055 | 000000 | | | GPRS SM Activate PDP Context accept | |
| 000726 | 12:29:03.246 | 00:01:53.246 | 000191 | UL-DCCH MeasurementReport | | | |
| 000731 | 12:29:10.377 | 00:01:54.377 | 001131 | DL-DCCH RadioBearerReconfiguration | | | |
| 000741 | 12:29:11.779 | 00:01:55.779 | 001402 | UL-DCCH RadioBearerReconfigurationComplete | | | |
| 000749 | 12:29:14.233 | 00:01:58.233 | 002454 | UL-DCCH MeasurementReport | | | |
| 000769 | 12:29:19.010 | 00:02:03.010 | 004777 | UL-DCCH MeasurementReport | | | |
| 000800 | 12:29:23.013 | 00:02:12.013 | 009003 | UL-DCCH MeasurementReport | | | |
| 000824 | 12:29:28.061 | 00:02:18.061 | 006048 | UL-DCCH MeasurementReport | | | |
| 000845 | 12:29:30.210 | 00:02:24.210 | 006149 | UL-DCCH UplinkDirectTransfer | | GPRS SM Deactivate PDP Context request | |
| 000859 | 12:29:42.834 | 00:02:26.834 | 002624 | | | GPRS SM Deactivate PDP Context request | |
| 000860 | 12:29:42.834 | 00:02:26.834 | 000000 | DL-DCCH DownlinkDirectTransfer | | GPRS SM Deactivate PDP Context accept | GPRS PDP Context Deactivation Successful |
| 000861 | 12:29:43.264 | 00:02:27.264 | 000430 | | | GPRS SM Deactivate PDP Context accept | |
| 000862 | 12:29:43.264 | 00:02:27.264 | 000000 | UL-DCCH UplinkDirectTransfer | | GPRS MM Detach request | |
| 000864 | 12:29:43.284 | 00:02:27.284 | 000020 | | | GPRS MM Detach request | |
| 000866 | 12:29:43.284 | 00:02:27.284 | 000000 | DL-DCCH RadioBearerRelease | | | |
| 000867 | 12:29:43.485 | 00:02:27.485 | 000201 | DL-DCCH DownlinkDirectTransfer | | GPRS MM Detach accept | GPRS Detach Successful |
| 000872 | 12:29:43.675 | 00:02:27.675 | 000190 | | | GPRS MM Detach accept | GPRS Detach Successful |
| 000873 | 12:29:43.675 | 00:02:27.675 | 000000 | UL-DCCH RadioBearerReleaseComplete | | | |
| 000878 | 12:29:44.937 | 00:02:28.937 | 001262 | DL-DCCH RRCConnectionRelease | | | |
| 000879 | 12:29:45.227 | 00:02:29.227 | 000290 | DL-DCCH RRCConnectionReleaseComplete | | | |
| 000880 | 12:29:45.237 | 00:02:29.237 | 000010 | UL-DCCH UplinkDirectTransfer | | | |

000295 12:28:04.873 GPRS MM – DETach REQuest UL-DCCH UplinkDirectTransfer

UL_DCCH_Message
 - message: uplinkDirectTransfer
 cn_DomainIdentity_0: RRC_ps_domain
GPRS Protocol discriminator: GPRS Mobility Management Msg Type: Detach request Force to standby: Force to standby not indicated Power Off: normal detach, Detach Type: (MS->net: GPRS detach) or (net->MS: re-attach required)
Mobile Identify[0]: 244, [1]: 2A, [2]: 144, [3]: 75, [4]: 55

Et. Radio Cause, P-TMSI signature 2: 11288539
GPRS MM – DETach REQuest

Figure 17c

MONITORING SYSTEM FOR A MOBILE COMMUNICATION NETWORK FOR TRAFFIC ANALYSIS USING A HIERARCHIAL APPROACH

This invention generally relates to systems, methods and computer program code for monitoring digital mobile communications networks, in particular digital mobile phone networks, for purposes such as a test, trouble shooting, and evaluation of a network and its usage.

FIG. 1 shows a simplified block diagram of a generic mobile communications network 100 such as a CDMA (code division multiple access), UMTS (universal mobile telecommunications system) or GPRS (general packet radio service) network. The terminology applied herein is not meant to imply limitation to any particular type of network.

Referring to FIG. 1, the network has a plurality of fixed base stations 102A-C referred to as base transceiver stations (BTS) or node B's each coupled to a respective base station subsystem 104A, B comprising a base station controller (BSC) or radio network controller (RNC) and a data packet control function (PCF) or packet control unit (PCU). Voice traffic is passed via a circuit switched connection to one or more voice switches 108 such as a Mobile services Switching Centre (MSC) and data traffic is passed via a packet switch connection to one or more packet switches 114 such as a PDSN (packet data switch node) or SGSN (serving GPRS support node). The voice switch(s) 108 connect via other core network elements 110 to a voice phone network such as PSTN (public switched telephone network) and the packet switch(s) 114 connect via further core network elements 116 to the Internet 118. Mobile stations 106A, B attach to one or more of the base stations.

The terminology used for the different network elements varies depending upon the type of network and in this specification the use of particular terminology, for convenience, does not imply limitation to any specific type of network.

Generically the latest generation of telecommunications networks (third generation) are encompassed by the International Mobile Telecommunications IMT-2000 standard which encompasses wideband CDMA (WCDMA) direct spread FDD (frequency division duplex) systems in Europe and Japan, CDMA2000 multicarrier FDD for the USA, and TD-SCDMA (time division duplex synchronons CDMA) for China. Further details of each of these specifications may be obtained by reference to the appropriate standards, which are the standards produced by the $3^{rd}$ Generation Partnership Project (3GPP, 3GPP2, at www.3gpp.org, www.3gpp2.org, hereby incorporated by reference.

Referring again to FIG. 1, a large number of interfaces are defined of which some are shown, in particular the $A_{bis}$ (CDMA2000) or $I_{ub}$ (UMTS) interface 103 between a base station and a base station subsystem, and the $A_{quater}$ (CDMA) or $I_u$ (UMTS) interface 105 between a PCF/PCU and a packet switch 114. In a CDMA2000 system the $A_{quater}$ interface comprises an A10 interface used to provide a path for user traffic between a PCF and a PDSN, and an A11 interface used to provide a signalling connection between a PCF and a PDSN for packet data services. Other interfaces in a CDMA2000 system include the $A_{ter}$ interface comprising A3 (user traffic and signalling) and A7 (signalling) for handoff (in Europe called handover) between base stations, and the A8 (user traffic) and A9 (signalling) interfaces between a BSC and PCF for packet data services. The A5 interface provide a path for user traffic for circuit-oriented data calls between a source base station (BS) and the MSC.

Various techniques are known for capturing data relating to the operation of a mobile communications network, depending upon the level at which the data is obtained. Generally mobile communication networks include an Operation and Maintenance Centre (OMC) (not shown in FIG. 1) which collects statistics from network infrastructure elements such as base stations and switches and compiles these into a database. This provides network operators with a high level view of the network performance and, for example, an OMC typically includes counters for every dropped call split out by cells and time. However, because OMC data comprises only high level statistics it is of limited usefulness in trouble shooting. For example OMC data cannot provide information relating to an individual communication session. Other high level data on how a network is performing can be obtained from call detail records (CDRs) and SS7 (signalling system number 7) data. At a lower level some diagnostic logs are available from individual items of equipment such as base station controller.

It is also known to tap a link or interface between infrastructure elements (either logical or physical) using a protocol analyser or IP (internet protocol) sniffer to record all the data flowing on such a link or across such an interface as a trace or log file. Such file can contain all the messaging between the two elements connected by the tapped link, for example all the messaging between a base station subsystem and a switch. However, there is a need for tools to extract useful information from such captured data.

At a still lower level a network may be tested by means of a simulated user "drive test" in which a mobile station is caused to establish calls in regular patterns to test a network. During these test calls a portable computer attached to the mobile stations gathers diagnostic information from the mobile, generally including air interface messaging, which is stored for later analysis. Alternatively diagnostic information may be incorporated into the test traffic stream so that this can be captured, together with associated signalling, from an interface within the network, as described further in the applicant's International patent application WO 03/047280, the contents of which are hereby incorporated by reference.

There is a need for improved diagnostic tools for mobile communications networks. For example, there is a need for techniques for handling and providing useful information from the vast quantities of data which may be captured at an interface of a mobile phone network.

In particular, there is a need for techniques which allow the operation of a network to be analysed to determine where problems are occurring, for example by drilling down to the level of individual communications sessions. It would also be useful not merely to know what problems are occurring, but also why they are happening, which in some cases can involve examining individual messages passed between network elements. A general problem with addressing the above needs is that of providing techniques to manage the large quantities of data for analysis which may be collected at a network interface, which make direct analysis of the raw data difficult.

According to a first aspect of the present invention there is therefore provided a method of processing digital mobile communications network data for analysis, the method comprising: inputting network data captured from a digital mobile communications network, said network data comprising data for a plurality of communications sessions over said network, said network data including a plurality of session related parameters; inputting query data for one or more queries, a query defining a statistic relating to one or more of said parameters, to be computed from said network data; formatting a said query to define said statistic in terms of one or more intermediate statistics relating to said one or more parameters and to be computed from said network data, said statistic being computable from one or more sets of said one or more intermediate statistics; operating with said formatted query on said captured network data to determine said one or more intermediate statistics; storing said intermediate statistics in a data store for analysis.

In embodiments pre-processing the captured network data to determine intermediate statistics for computing one or more desired statistics enables complex analysis of the captured data through manipulation of the intermediate statistics without the need to statistically process raw data from the network every time a different presentation of statistical data is required. Thus a desired statistic may be determined from one set of intermediate statistics or from a combination of several sets of intermediate statistics, depending upon how it is desired to roll up and present/output the stored data. Thus, in effect, the captured raw network data is pre-processed to facilitate further analysis later. In effect the intermediate statistics are a representation of one or more desired statistics, the representation allowing the intermediate statistical data to be validly combined or aggregated to generate an aggregated statistic for an aggregation of data. This enables the data analysis problem to be broken down into a set of manageable chunks, as well facilitating implementation of embodiments of the method in a distributed computing environment where not all the links between elements of the computing environment are very high bandwidth.

The captured data may comprise user traffic data, for example an HTTP request, and/or signalling data, for example a request or acknowledgement to set up a link between two network elements. Generally the captured network data will be in the form of a stream of messages conforming to a protocol stack at an interface or link at which the data is captured. Thus in embodiments this stack may be decoded and the messages organised prior to determining the intermediate statistics, for example by splitting up the messages into a plurality of files or other data structures corresponding to a plurality of communication sessions using the link or interface at which the data is captured. Thus preferably the captured data is split out by communications session and a session identifier added. The session identifier may be stored in the above mentioned data store as an additional one of said parameters, optionally but preferably including a file name or other link to the session data file; this file name may be treated as an additional intermediate statistic. Structuring the data in this way facilitates drill down from statistical data on how the network is operating to captured message data for a session which can show where problems are arising without the need to manipulate large volumes of data during statistical analysis. Thus, for example, the data structures or files holding the session data may only be accessed one at a time when statistical analysis has indicated which session file should be examined and thus, for example, these data structures or files may be made accessible over a relatively low bandwidth link such as a wide area network (WAN). In this way statistical analysis of the captured data may be performed, for example, at a central or headquarters location whilst raw captured data (if retained) or session data files may be stored "in the file" for example adjacent where the data is captured (since a high bandwidth link is normally required at this level). This in turn facilitates the installation of a plurality of data capture devices at a plurality of locations within a network, all feeding intermediate level statistical data back to a central processing unit for analysis.

A communications session may comprise a voice or data communications session between any two elements of a network or between an element of the network and an external element such as a web server. Generally, however, a communications session comprises a data communications session established between a mobile device attached to the digital mobile communications network and another device such as a web, file or email server. A communications session may last only a very short time, for example when sending or receiving a short message, or it may last all day or even several days, or be interrupted and resume. A mobile device may have more than one concurrent communications session.

A query generally comprises one or more parameters and one or more statistical expressions relating to the parameters. A parameter may itself be an expression. As an example, the statistic or statistical expression may comprise an average data throughput, and the related parameters may comprise a PDSN ID, a BSC ID and an IMSI (international mobile subscriber identity), thus allowing average throughput to be determined for, say, a particular PDSN, either for all BSCs or for just a subset of BSCs, optionally filtered by IMSI, or alternatively average throughput can be determined for a particular IMSI for all or just some PDSNs. Formatting a query in terms of said intermediate statistics facilitates analysis by one or more query parameters, rolling up or aggregating intermediate statistical data for unwanted parameters so that, in the foregoing example, analysis by PDSN may be used to identify a particular PDSN which has a low throughput and this can then be expanded for analysis for IMSI to determine whether the slow throughput is a consequence of a problem with any particular mobile device say skewing the statistics. If this turns out to be the case the data may then be further analysed, for example to determine whether a particular mobile device (IMSI) is having problems with only one PDSN, base station or BSC, which might point to a coverage problem, or with many BSCs or PDSNs, which might point to a handset-network compatibility problem. Preferably, therefore, the one or more intermediate statistics are indexable by the one or more parameters of the query to which they relate, in embodiments each value of each parameter defined by a query having an associated set of intermediate statistics.

In a preferred embodiment of method the above described formatted query operates on a data pipe comprising a sparse data structure to determine the one of more intermediate statistics. The data pipe preferably comprises a time ordered array of parameter values determined from the captured network data. A storage location may be allocated to each parameter of a set of read or expected parameters at each time interval. Each time interval may correspond to a message and each parameter of a message may be written into its corresponding storage location, recognising that since normally each message will only contain a subset of the possible parameters some storage locations for each message will remain unused. Such a structure does, however, facilitate rapid processing of the captured data, and a (formatted) query may operate by reading parameters at a time position on the data pipe, for example at the end of the data pipe, each new incoming message stepping the parameter data (or at least a pointer thereto) on by a time increment. Effectively attaching a formatted query to a (time) position on the data pipe enable account to be taken of dependencies between queries. For example a higher level query may require a result from a lower level query or statistical expression, and the higher level query can thus be attached at a later point in the data pipe, after the lower level query has performed its calculation. Intermediate statistical values or the results of formatted queries can be stored at (time indexed) locations within the data pipe in a similar manner to message parameters. A similar data pipe structure can advantageously be employed when assigning messages to communication sessions after the coding a protocol stack for the captured network data, in this case a session identifier rather than an intermediate statistic being stored, like a parameter, in the data pipe. A session identification function may have to wait for a number of messages to pass before an identification can be unambiguously allocated; in this case a session identifier may temporarily allocate a session identifier and resolve this when possible. This resolution may involve writing session identifiers (as parameters) into messages which have already gone "past" the session identifier attachment point on the data pipe. For this reason a session splitter data pipe preferably has a separate session output function attached at a later point in the data pipe than the session identifier so that as message data moves down the pipe (or pointers move along the pipe) messages are first allocated to sessions, as far as possible, by writing into the data for a message session identifier, and then later, as each message arrives in turn at a session output function the session identifier may be read and the message written into an appropriate session data file.

In a preferred embodiment a plurality of such session data files is created and then the formatted query may operate on each session data file in parallel to more actually handle the captured data. Since the use of intermediate, aggregatable statistics allows a desired statistic to be determined from a combination of these lower level statistics separate intermediate statistics determined for each session data file can be written into the data store and afterwards combined to produce a combined statistic for the captured data. Thus, as previously mentioned, one of the parameters by which data in a data store is indexed is preferably a session identifier, and a session file name may be included as, in effect, another intermediate statistic. In a distributed, parallel computing environment one or more data processors may be allocated to operate on each session file.

The data store preferably comprises a database, and this may include code to automatically combine intermediate statistics into a higher level desired statistic. In a preferred embodiment a schema or configuration for the database is determined by the one or more queries to be implemented, thus enabling a more efficient database implementation. Thus a set of statistics making up one or more queries defines a table (or tables) for the database rather than, say, a fixed set of database tables suitable for all possible queries being employed. Optionally such a database may include data for one or more identified communication sessions, for example as binary large objects (BLOBs). The above described method may further comprise analysing data in the data store, such analysis may be performed automatically, for example to generate a user quality of service or marketing report, or the analysis may be performed in response to operator input, for example for troubleshooting. This may comprise inputting selection data defining one or more selected parameters, reading the intermediate statistics for the selected parameters, combining the intermediate statistics for any parameters to be "rolled up" and then outputting the result, for example for graphical display and/or further interactive analysis. Embodiments of the method may also advantageously be employed to provide marketing data as it is possible to determine information relating to the use an individual user is making of the network, determining, say, the most commonly accessed websites for a user, the average quality of service for a user and the like. Information of this type relating to individual users is currently not available from networks and the use of intermediate statistics further facilitates the aggregation of such information to address potential privacy issues whilst retaining useful detail.

In a related aspect the invention provides a system for processing digital mobile communications network data for analysis, the system comprising: means for inputting network data captured from a digital mobile communications network, said network data comprising data for a plurality of communications sessions over said network, said network data including a plurality of session related parameters; means for inputting query data for one or more queries, a query defining a statistic relating to one or more of said parameters, to be computed from said network data; means for formatting a said query to define said statistic in terms of one or more intermediate statistics relating to said one or more parameters and to be computed from said network data, said statistic being computable from one or more sets of said one or more intermediate statistics; means for operating with said formatted query on said captured network data to determine said one or more intermediate statistics; means for storing said intermediate statistics in a data store for analysis.

The invention further provides a query formatting code module, the code module comprising computer program code to, when running: input query data for one or more queries, a query defining a statistic relating to one or more parameters of a digital mobile communications network communications session, to be determined from data captured from said communications network; and format a said query to define said statistic in terms of one or more intermediate statistics relating to said one or more parameters and to be computed from said network data, said statistic being computable from one or more sets of said one or more intermediate statistics.

The invention also provides a digital mobile communications network data analysis code module, the code module comprising computer program code to, when running: read one or more intermediate statistics for a query relating to one or more parameters of a digital mobile communications network communications session, said query defining a statistic to be determined from data captured from said communications network and computable from one or more sets of said one or more intermediate statistics; and determine said statistic from said one or more sets of said one or more intermediate statistics.

The above described code modules provide one way of implementing embodiments of the above described method, one of the code modules formatting a query according to the above described method, the other reading the intermediate statistics generated by operating with the formatted query and, in embodiments, determining a statistic defined by the query which the formatting re-defined in terms of intermediate statistics.

According to another aspect of the invention there is provided a method of processing digital mobile communications network data for analysis, the method comprising: inputting network data captured from a digital mobile communications network, said network data comprising data for a plurality of communications sessions over said network, said network data including a plurality of session related parameters; dividing said captured network data into a plurality of data structures, one for each said communications session; processing said divided data in accordance with one or more queries to generate statistical data for each of a plurality of said sessions, said query defining at least one statistic relating to one or more said parameters; storing, in a data store, said statistical data for each of said sessions in association with a session identifier; whereby network data for a session used to generate said statistical data is retrievable.

Storing the statistical data derived from a session in association with a session identifier allows the session data used to generate the statistical data, in particular intermediate statistics, to be retrieved for detailed analysis. In effect a session data file is indexed by (intermediate) statistical data generated from the file, and this allows, for example, an engineer troubleshooting a network to first of all identify broadly where the problem is and then to drill down into actual message data with the aim of pinpointing the problem. Depending upon the implementation a query may be hard programmed into code implementing the method but more generally a query is user and/or system determinable. The statistical data is preferably aggregatable as described above to allow a statistic defined by a query to be generated from captured data from a combination of two or more communications sessions.

In a related aspect the invention provides a system for processing digital mobile communications network data for analysis, the system comprising: means for inputting network data captured from a digital mobile communications network, said network data comprising data for a plurality of communications sessions over said network, said network data including a plurality of session related parameters; means for dividing said captured network data into a plurality of data structures, one for each said communications session; means for processing said divided data in accordance with one or more queries to generate statistical data for each of a plurality of said sessions, a said query defining at least one statistic relating to one or more of said parameters; and means for storing, in a data store, said statistical data for each of said sessions in association with a session identifier; whereby network data for a session used to generate said statistical data is retrievable.

The invention further provides a code module comprising computer program code to, when running: input network data captured from a digital mobile communications network, said network data comprising data for a plurality of communications sessions over said network, said network data including a plurality of session related parameters; and divide said captured network data into a plurality of data structures, one for each said communications session.

In another aspect the invention provides a code module comprising computer program code to, when running: process captured network data in accordance with one or more queries to generate statistical data for each of a plurality of communications sessions in said network data, a said query defining at least one statistic relating to one or more of parameters of messages in said captured data; and store in a data store said statistical data for each of said sessions in association with a session identifier; whereby network data for a session used to generate said statistical data, is retrievable.

The invention further provides a system for parallel processing digital mobile communications network data for analysis, the system comprising: a plurality of data processors each configured to input network data for one of a plurality of concurrent communication sessions captured from a digital mobile communication network and to operate on said session data to generate statistical data; and a database, coupled to said plurality of data processors, to store said statistical data for analysis.

In embodiments the input network data is divided between processors on a per session basis by an input device or splitter, so that processors can operate on the data in parallel. The database may be coupled to the plurality of data processors over a network such as a wide area network. The system may further include a query definition code module, for example including a graphical user interface (GUI), optionally running on a separate machine. This or another GUI or an API may provide an output code module to read and aggregate statistical data for a plurality of sessions. The above-mentioned splitter may be implemented using a data pipe, for example with one storage location per parameter per captured message, as described above. Preferably such a splitter is considered to write session identification data for captured messages into the data pipe, the session identification data being derived from or dependent upon decoded message parameters. The system may further comprise a report generator, for example to automatically generate a marketing or user quality of service report.

In another aspect the invention provides a data splitter for dividing data captured from a digital mobile communications network comprising data for a plurality of communications sessions into data for separate communication sessions, said data splitter comprising: an input to receive said captured network data; a protocol stack decoder to decode a protocol stack of said captured network data and provide message data for said plurality of communication sessions; a data pipe, coupled to said protocol stack decoder, said data pipe being configured to store said message data in time order; a session tracker to write session identification data into said pipe responsive to said message data; and a session exporter to read said message data and said session identification data and to export said message data to a session data file store selected according to said session identification data.

Preferably the session exporter is attached to the data pipe, that is reads, listens, or responds to events in the data pipe at a position following or effectively later in time than the session tracker. In preferred embodiments the data splitter is implemented as computer program code, which may provided on a carrier. The message data may comprise traffic and/or signalling data.

In a still further aspect the invention provides a system for generating a report on a digital mobile communications network, the report comprising statistical data derived from an aggregation of data relating to measurements characterising performance of the network for individual users, the system comprising: a data capture device to capture data from an interface of the network; a data processor to process said captured data to generate statistical data relating to individual data communication sessions using said network; and a report generator to input said statistical data and generate a said report.

The user data may comprise user traffic and/or associated signalling data.

The skilled person will understand that the above described methods and systems will generally be implemented using computer program code thus the invention also provides such computer program code, optionally on a carrier, and also computer systems including this code. The code may be written in any conventional programming language, for example Visual C++ or a lower level language, and may be distributed between a plurality of coupled components in communication with one another, for example in a distributed net, network-based computer system. In preferred arrangements the code comprises a number of separate, communicating code modules rather than a single large program, for ease of maintenance.

Embodiments of the above-described methods may be implemented on standard computer hardware by installing software embodying aspects of the invention. A data carrier carrying the program code may comprise a disk such a CD—or DVD-ROM, programmed memory such as read only memory (firmware) or a data carrier such as an optical or electrical signal carrier, for example for downloading a code module from an FTP (file transfer protocol) site.

These and other aspects of the invention will now be further described, by way of example only, with reference to the accompanying figures in which:

FIGS. 5a to 5e show, respectively, an example of a session data file, a message protocol stack, a session data file processing system, an example of a network interface state diagram, and an example of a query table;

FIG. 12 shows an example of use of the system of FIG. 2 for analysing connection setup time problems;

FIG. 13 shows an example of the use of the system of FIG. 2 for analysing radio related access problems;

FIG. 14 shows an example of use of the system of FIG. 2 to investigate network congestion;

Figure 2:
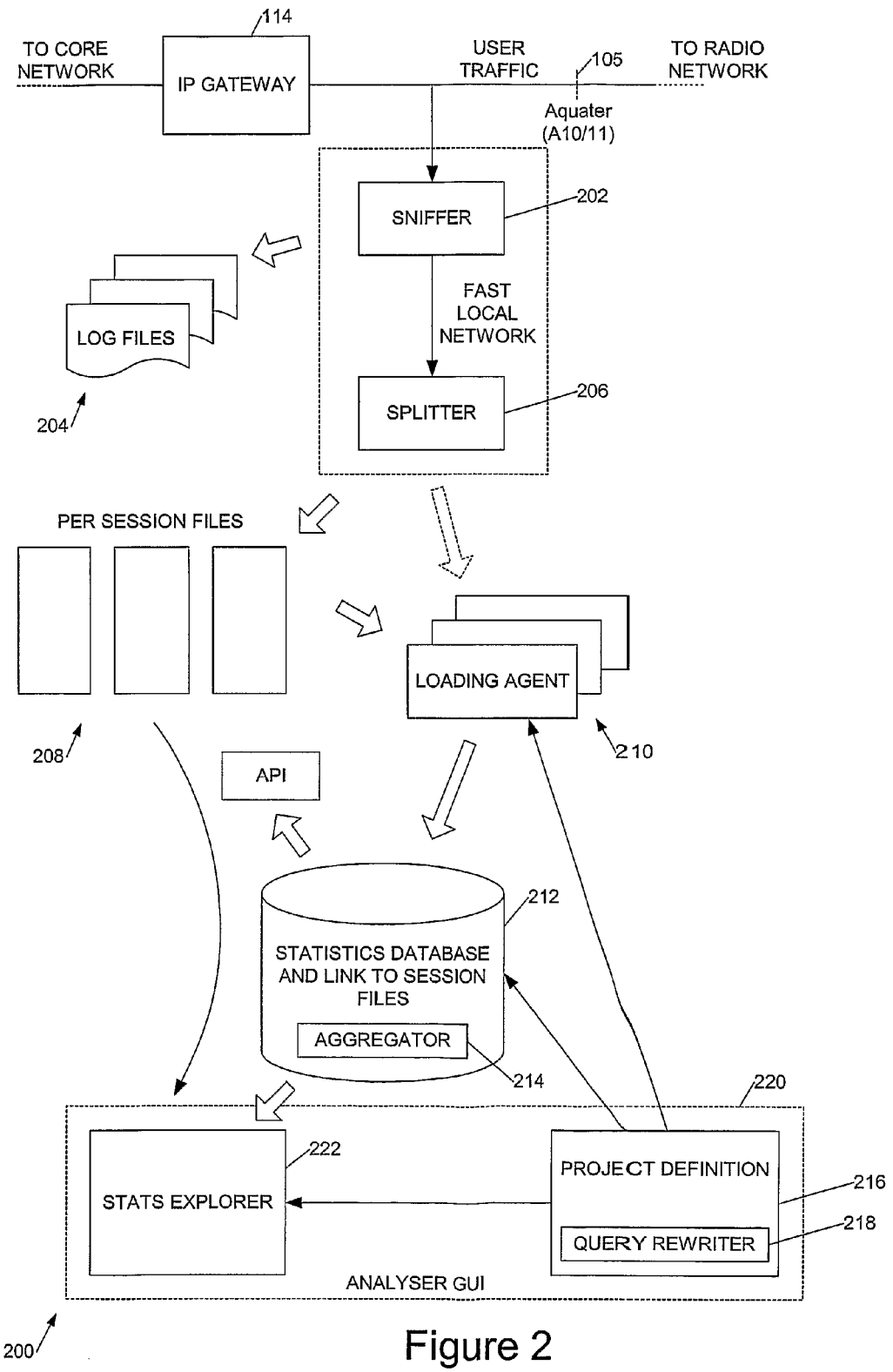
FIG. 2 shows a block diagram of a network monitoring system embodying aspects of the present invention.
Figure 17A:
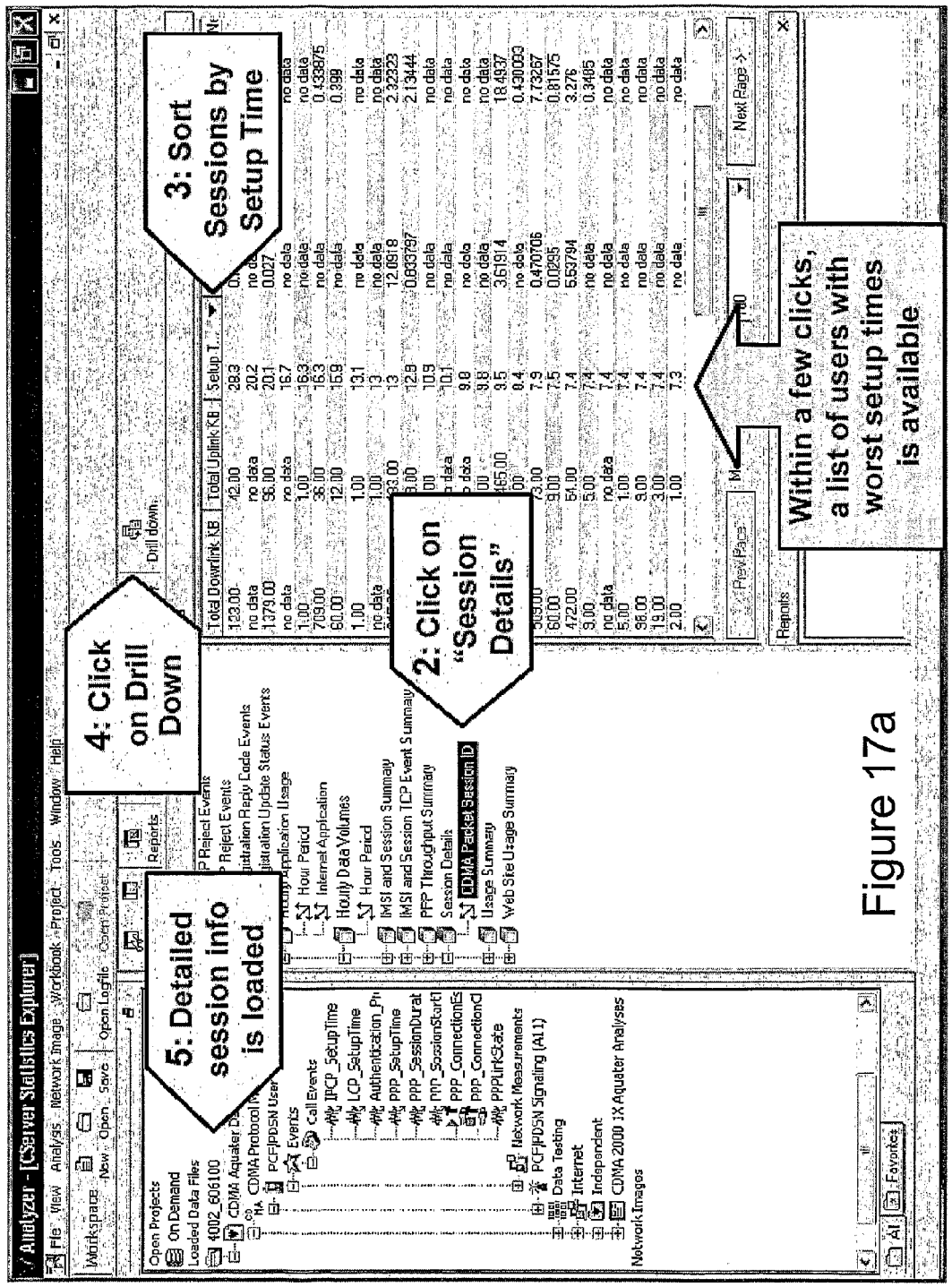
Figure 17B:
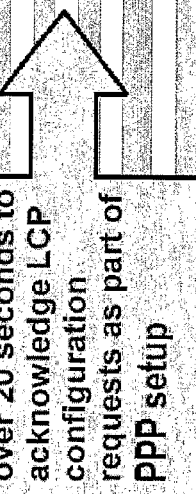

FIGS. 15a to d show an example of use of the system of FIG. 2 to investigate radio network delays, explore individual user delays, identify a problem associated with an individual user, and investigate the individual user problem respectively;

FIG. 16 shows an example of use of the system of FIG. 2 to investigate user/session authentication; and FIGS. 17a to 17c show use of the system of FIG. 2 to investigate and locate potential problems associated with individual users, and two examples of drill down into message data for a particular communications session of an individual user.

Figure 1:
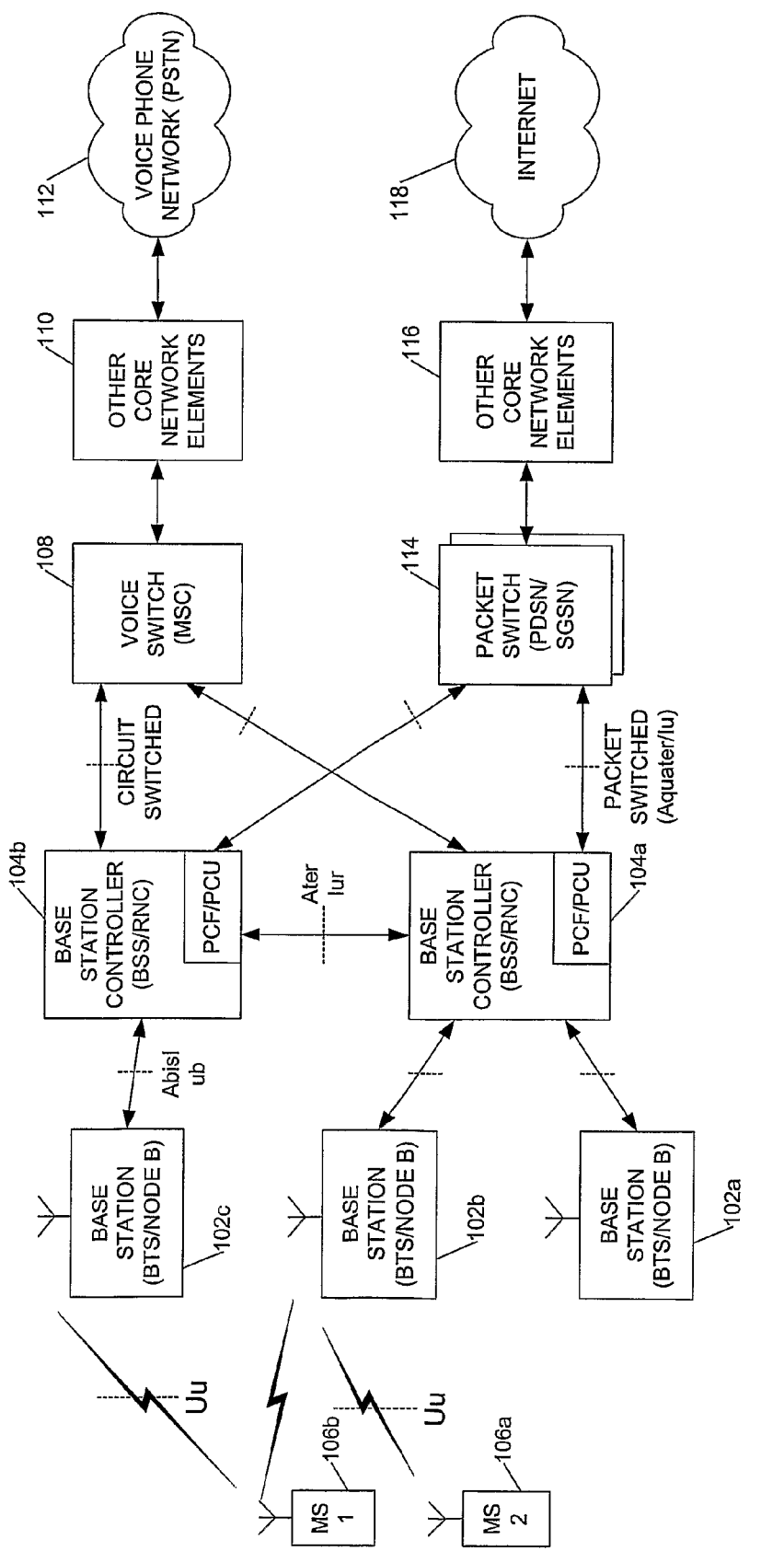
FIG. 1 shows a portion of a generic mobile telecommunications network.

FIG. 2 show a network monitoring system 200 embodying aspects of the present invention. As illustrated the system is being employed to capture user traffic (A10) and signalling (A11) information from the $A_{quater}$ interface 105 of FIG. 1 although in other embodiments similar systems may be employed to capture data from other interfaces in the generic network of FIG. 1. The data across interface 105 comprises data exchanged between the core network (to the right of the interface in FIG. 1) and the radio network (to the left of the interface in FIG. 1), tunnelled within IP (internet protocol) data packets at typical data rates of between 1 Mbps per second and 1 Gbps per second; further details of the protocols employed are given later.

In the illustrated embodiment data packets crossing interface 105 are captured by a software sniffer 202, for example comprising a general purpose Unix or Windows (trademark) computer system running appropriate software such as Tethereal, a free network protocol analyser available from ethereal.com or one of the several products available from Network Associates of Santa Clara, Calif., USA. The skilled person will be aware that there are many other commercially available network protocol analysers. Sniffer 202 captures data packets from the network and writes this data to one or more log files 204, sometimes called "trace" files. Such files may be very large and may contain substantially all the messaging between the two elements connected by a link or interface being tapped (although in practice the occasional message may be missed).

A sniffer or protocol analyser may also decode a protocol stack of the packets it captures. In CDMA-type systems standard internet-related and tunnelling protocols are employed such as PPP (Point to Point Protocol, RFC 1548, 1549, 1332, 1333, 1334, 1551, 1376, 1377, 1378), and GRE (Generic Routing Encapsulation, RFC 1701/2) and hence standard protocol analysers can be employed. More specialised protocol analysers are generally required for GPRS and UMTS networks and the main manufacturers of these are NetHawk Oyj in Finland (NetHawk 3G series of products) and Tektronix, Inc of Oregon, USA (for example the K1297); other manufacturers of protocol analysers include Agilent, and Edixia of Telecom Technologies, France (for example the GSM/GPRS and UMTS Ocean instruments). Protocol analysers from these manufacturers can capture ATM (Asynchronous Transfer Mode) data and also provide a degree of protocol stack decoding.

The log files 204 and generally stored on a local hard disk of the sniffer 202. The captured network data is provided to a splitter 206 which (further) decodes the protocol stack, and described in more detail later, and splits the message data into a set of session files 208, one for each concurrent communications session carried by interface 105. Data is preferably provided from the sniffer 202 to the splitter 206 in real time or pseudo real-time over a fast link such as a fast local Ethernet connection or an SDH (Synchronous Digital Hierarchy) link, so that captured data does not accumulate beyond the capacity of sniffer 202 to store the captured data.

Broadly speaking splitter 206 tags each message in a captured stream either with a session identifier when this can be assigned or with a temporary identifier for a thread with the aim of resolving the temporary identifier at some later stage when data allowing a message in a thread to be assigned to a session is captured. Message data is stored sequentially in order to capture time in a session data file 208. The length of a session data file can vary considerably, for example from a few kilobytes for an email to many megabytes for an FTP (file transfer protocol) or HTTP (hypertext transfer protocol) session.

Data in the session data files is processed to generate statistics for later analysis. These statistics can be based upon the traffic, for example to measure throughput, and/or captured signalling, for example to count events such as successful/failed acknowledgements. As will be described further later, the third embodiment of the system allow drill-down into individual data sessions to examine the captured traffic and/or signalling, for example to determine which particular website or sites are being accessed in an HTTP session or to investigate a series of messages associated with a failed radio link setup request in order to locate and address network or related problems.

It will be recognised that it is desirable for both communications and processing in the system of FIG. 2 to be able keep up with the rate of network data traffic. In a preferred embodiment, therefore, processing of each session data file is performed by a separate (general purpose) computer system, here confirmed a loading agent 210. A plurality of loading agents 210 is provided, for example as a set of rack mounted or blade servers (no monitors, keyboards or mice required), each with appropriate software as described later. A loading agent may comprise, for example, a Windows (trademark) computer system with a 2.8 GHz P4 processor, 1 Gb of memory, a 100 Mbps Ethernet link and a 100 Gb+hard drive. Preferably the session files 208 are stored on the hard disk drives of the loading agents 210 and splitter 206 writes data for each new communications session into these hard disk drives using a round-robin procedure. This reduces the risk of the system being input/output bound as compared with writing to a single hard disk drive.

The use of loading agents as described above provides a scaleable means of processing captured data, each loading agent handling, for example, between 2 and 10 Mbps of captured traffic, depending upon the statistics to be determined. To process higher data rates in real time additional loading agents, each on its own computer, may be deployed in parallel. Likewise the use of a plurality of loading agents provides some redundancy should a device fail. The statistics determined by a loading agent are defined by one or more queries constituting a "project", as described further later. The session data is automatically processed in accordance with the queries to generate decimated data comprising relatively low rate statistical data, which is then provided to a statistics database 212. The statistical data comprises low level statistics such as sums and counts which are stored in tables indexed by one or more message parameters. Each parameter acts as one dimension of a potentially multi-dimensional view of the captured data, thus allowing statistics relating to the captured network data to be viewed according to sets of one or more dimensions and rolled up in the "unwanted" dimensions. This approach allows the statistical data to be filtered and combined so that it can be viewed by first one set of parameters and then a different set of parameters, for example to first view the data by, say, network element (BS, BSC, MSC, PDSN and the like) and then by, say, a user-related parameter or parameters such as IMSI (international mobile subscriber identity), session, and/or time.

As described further below, in order to allow statistical data from a plurality of separate sessions to be combined, database 212 stores intermediate or aggregatable statistics comprising an intermediate level representation of a desired set of statistics represented, for example, by a project or query. Preferably the use of such intermediate or aggregatable statistics is substantially transparent to a user and database 212 preferably therefore includes an aggregator 214 embodied, for example, as program code comprising part of the database, the function of which is to automatically aggregate intermediate level statistics into a desired output statistic. The initial conversion of a desired statistic for statistics as defined by a query is performed transparently by a query re-writer 218 within a project definition code module 216.

Database 212 preferably also includes a link to the session data files 208 which store, essentially, captured raw message data. The parallel loading agent configuration together with a link to session data files stored on hard disk drives of the loading agents enables drill-down into raw session message data without placing an undue requirement for communications bandwidth between database 212 and front end analysis software and the data capture and statistics determination portion of the system. This is because only the raw message data for one or more selected sessions needs to be transferred as compared with all the data were, say, all the session data files to be stored within statistics database 212. However, some (or in less preferred embodiments, all) session data may be stored in database 212, for example as Binary Large Objects (BLOBs). The structure of FIG. 2 allows the statistics database and front end analysis software to be physically separate from the data capture and statistical processing portion of the system so that, for example, data capture and pre-processing can be performed in a room housing elements of the network whilst subsequent data analysis can be performed at some other location, for example corporate headquarters.

Database 212 is also accessible via a client computer system 220, comprising a project definition code module 216 and query re-writer 218, and a front end interface to the database 222 here termed a statistics explorer. The statistics explorer 222 provides a graphical user interface (GUI) for statistics output from database 212 as well as allowing drill-down to raw data sessions for in-depth analysis of network-associated problems. The code to display the raw message data preferably incorporates a protocol stack browser and may include a chart or call-tracing. Some examples of graphical presentations of raw call message data are described in the applicant's co-pending UK Patent Application No. 0322979.6, filed 1 Oct. 2003. The statistics may relate to a single session or a set of sessions, or to a combination of statistics for a single session, for example where a loading agent has fragmented a long session.

The project definition module 216 allows a user to define a "project" preferably using a set of templates. A project comprises a set of queries and each query has associated with it one or more data tables, each table comprising one or more parameters or "dimensions" and corresponding (intermediate) statistics. Thus a query also comprises a set of statistics. Associated with a set of queries making up a project is a set of reports which a user is able to design and generate. When a user defines a query a drill-down option can also be specified to provide access to raw message data. This can be used, for example, to investigate the reason for a long round trip time or, say, to identify IP address patterns which might indicate the presence of a virus. As a project comprises a set of queries and a query defines one or more tables the project definition module effectively defines a schema for database 212. Preferably the project definition also includes data indicating a length of time to keep the session data files and database tables, which can vary from a day or two to several months (if, for example, historical trends are to be analysed). In one preferred implementation processing modules to compute statistics are implemented on the loading agents as listeners and a query typically comprises a tree of listeners. As illustrated in FIG. 2 a project definition is pushed to the loading agents 210 and database 212 also hosts one or more project configuration files including standard tables, in particular a project name and identifier and a list of successfully loaded and split session data files, although a session file directory is hosted on the splitter 206.

Figure 3:
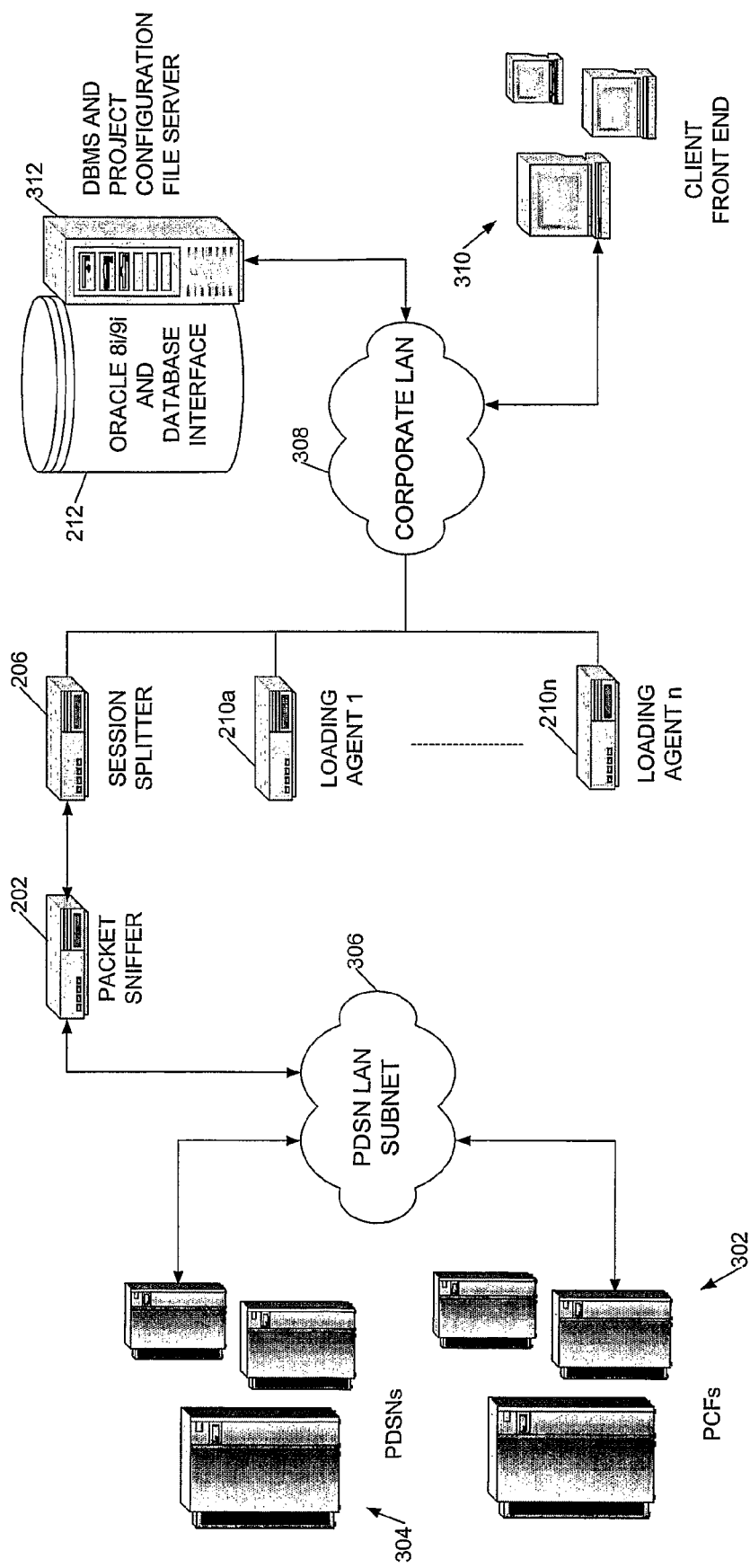
FIG. 3 shows an exemplary hardware architecture of the system of FIG. 2.

FIG. 3 shows a hardware architecture 300 which may be employed to implement the system of FIG. 2. Referring to FIG. 3, a plurality of PCFs 302 is coupled to a plurality of PDSNs 304, typically at the same location as the PCFs, by means of Ethernet connections to a PDSN LAN (local area network) subnet 306. The packet sniffer appliance 202 also connects to this subnet and provides captured packet data to the session splitter computer system 206 which, in turn, is coupled via Ethernet to a plurality of loading agents 210a-n and to a corporate LAN 308. Also connected to corporate LAN are one or client front end computer systems 310 and a database management system (DBMS) and project configuration file server 312 with code to provide an interface to, for example, an Oracle (trademark) 8i/9i Professional database. The client front end systems host project definition and statistical analysis code as previously described with reference to FIG. 2 and comprise any conventional general purpose computer system. Likewise the Oracle DBMS file server may comprise a conventional computer system such as a Windows (trademark) or Linux (trademark) computer system with, for example, a 100 Db hard drive 1 Db RAM and a 100 Mbps Ethernet card.

Figure 4:
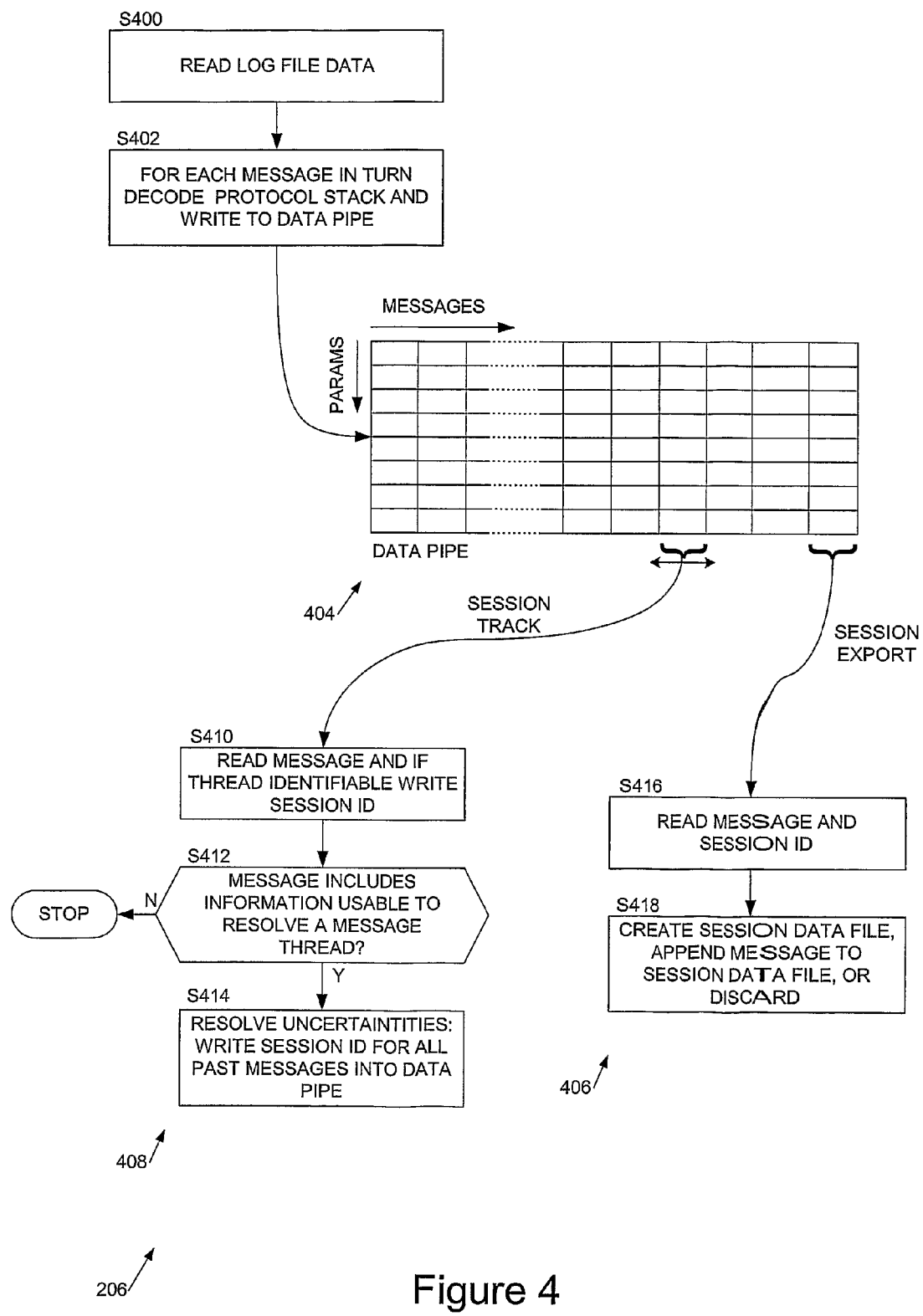
FIG. 4 shows a network message pre-processing system.

FIG. 4 shows details of one embodiment of a session splitter 206 for splitting a captured data stream into a plurality of separate files, preferably one for each communications session. Initially, at step S400, the splitter reads captured packet data from a log file and, at step S402, decodes the protocol stack message by message and writes the decoded message data into a data pipe 404, for example using PCAP format (RFC 2026). In CDMA type systems such as CDMA2000 variants, where the $A_{quarter}$ protocol stack is described with reference to FIG. 5b below, it is straightforward to decode the protocol stack by reference to the previously mentioned RFCs (requests for comment), which generally include sample decoders (hereby incorporated by reference). In other networks, for example UMTS networks, the protocol stack may be at least partially decoded by the protocol analyser used to capture the data; further details of protocol decoding in UMTS networks are given in UK Patent Application No. 0322979.6 filed on 1 Oct. 2003 in the name of Actix Limited, the contents of which are hereby incorporated by reference.

The data pipe 404 comprises a plurality of storage locations for storing a plurality of captured messages in time order, the messages entering the data pipe at a starting point and effectively propagating down the pipe to an end point where they are extracted and processed by a session export module 406 (although in practice it may be easier to move a pointer than the messages). The storage location for each message is configured for storing a plurality of parameters, but at the splitter stage it is merely necessary to allocate a message to a communications session and there is no need, for example, to decode a message to determine what a particular user is doing provided that the start and end of a thread is identifiable.

A session track module 408 is employed to identify a communications session thread, for example by picking up the start and end of the thread. The session tracking module, and the session export module, may each comprise a listener attached to the data pipe 404, the session track module being attached prior to the session export module, optionally at a movable position, to allow session identification data to be retrospectively attached to messages in the pipe which have already gone past the session tracking listener attachment point but which have not yet reached the session export point. This is because it is not always possible to immediately assign a message to a particular communications session and it may be necessary to temporality allocate a session identifier to a message and then resolve the temporary allocation when a later received message allows this to be done.

In one embodiment, for a CDMA-type system $A_{quarter}$ interface, the session tracking module 408 is implemented as shown by steps S410-S414 in FIG. 4. Thus at step S410 the session tracking module reads a message and if the message belongs to an identifiable thread, for example because it includes a TCP packet sequence number linking it to an already received packet, then the session tracking module writes a session identifier into a memory location in the data pipe associated with the message. Otherwise, at step S412, the procedure determines whether the messages includes information useable to resolve a message thread, that is information characteristic of an individual communications session which may be used to link messages or sets of messages into a common thread. Examples of such information include an IMSI, and network assigned identity, two messages with the same IMSI, say, being presumed to belong to the same communications session thread. If no such information is found the procedure stops, otherwise, at step S414, the procedure writes an identifier for the session into all messages in the thread which are linked by the information in the most recently processed message, in particular including those in the thread which have already passed the session tracking listener window. Further messages received by the session tracking listener are allocated the now determined session identity.

Details of tracking sessions in a UMTS network are given in the applicant's UK Patent Application No. 0322979.6 filed 1 Oct. 2003, hereby incorporated by reference, which describes in particular call or session tracking at the Iub interface.

The basic concept involves assigning a first session identifier to at least one message having a first signalling parameter; assigning a second session identifier to at least one message having a second signalling parameter; identifying a message having both said first and said second signalling parameters; and identifying messages of the communications session by linking said at least one message having the first session identifier and said at least one message having the second session identifier using said message having both the first and the second signalling parameters.

The first and second signalling parameters need not always be present in each message but providing the messages can be grouped into sets and linked by at least one message with both these parameters in effect chains may be extended forwards and backwards from the message with both parameters to identify messages associated with a particular communications session or call. These messages may then be output, for example to a file, either grouped according to the session or call identity or, as a time-ordered sequence with a call or session identifier accompanying any signalling parameters read from the messages. The messages may comprise or be derived from data packets or ATM (asynchronous transfer mode) cells, and an ATM virtual connection identifier may be employed as the first signalling parameter, depending upon which messages are to be linked.

Some messages may be assigned the first session or call identifier and some the second session identifier even though all these message may belong to a single session or call and thus when the two sets of messages have been linked this effective ambiguity may be resolved by converting one identifier to the other, for example by giving all messages with the first session identifier the second session identifier. The first and second session identifiers may be managed by making one, say the second session identifier, positive and the other negative. In a UMTS network the linking of sets of messages may be indirect so that, for example, the message having the second signalling parameter may also possess a third signalling parameter so that assigning the second session identifier to this message also associates this identifier with the third signalling parameter. For example, in a UMTS network the second signalling parameter may comprise a scrambling code (SC) such as a long or up link (UL) scrambling code and the third signalling parameter may comprise an RNC identifying parameter (sometimes referred to as a CRNC identifier or more precisely as a CRNC communication context identifier when the parameter identifies a communication session or communication context associated with the RNC rather than the RNC itself). Then when, for example, the first signalling parameter comprises a packet TMSI (temporary mobile subscriber identity) associated parameter the CRNC may be assigned a second session identifier, which is also associated with a scrambling code and for which, at some point, there is expected a connection setup message including both the scrambling code and the packet TMSI associated parameter.

Tracking calls on a circuit or packet switched Iu interface in a UMTS network is considerably more straightforward than tracking calls on the Iub interface. At the Iu interface each message has either one or other of a Source Local Reference (SLR) and Destination Local Reference (DLR). Thus a single table may be employed to link an SLR to a DLR and, optionally, to an ATM connection identifier comprising ATM parameters VPI (virtual path identifier), VCI (virtual channel identifier), and CID (channel identifier).

The session export module 406 is relatively straightforward and, at step S416, reads a message and where available a corresponding session identifier from the data pipe and then at step S418 either creates a new session data file for the message, or appends the message to an existing session data file where one exists, or discards the message if no (resolved) session identifier was allocated. This latter situation can occur where the log files are fragmented or where data capture begins in the middle of an existing communications session so that network signalling for example between a PDSN and a mobile device or other network element, setting up the communications session is missed.

Referring now to FIG. 5, this illustrates operation of a loading agent, which works with data read from session data files created by the splitter 206. Thus FIG. 5a shows an example of such a data file 500 which comprises a time ordered sequence of messages, for the example of data captured from the $A_{quater1}$ interface of a CDMA-type network each having a protocol stack as shown in FIG. 5b.

Referring to FIG. 5b a data packet 502 comprises a payload 504 of user data such as email data, image data, FTP data or streamed media data within a IP layer 506 for communication between a mobile station and, say, a web site. To this is added a PPP header 508 for communication between a mobile station and a PDSN and on top of this is added a GRE protocol 510 and a further IP protocol header 512 which controls communication between a PDSN and a PCF. In some instances further tunnelling may be included within payload data 504, for example to provide a virtual private network (VPN) using HTTPS (hypertext transfer protocol secure).

Referring now to FIG. 5c, this shows a preferred embodiment of a loading agent 210. At step S514 the loading agent reads the session data file and (depending upon whether the format requires it) for each message in turn (S516) decodes the protocol stack, for example as shown in FIG. 5b, to read traffic and/or signalling parameters therein, further details of which are given later. These parameters are written into a data type 518 comprising a time-ordered sequence of message stores, each message store having storage locations for a plurality of parameters. The plurality of parameters preferably comprises all those parameters which may be encountered in a captured message together with additional parameters which may be determined by listener functions (as described below) and written into the data pipe.

One or more listener trees 520 is attached to the data pipe 518, a listener tree comprising one or more listeners each determining a statistical parameter from messages in the data pipe. Higher level functions may utilise the results from one or more lower level functions (which may be written back into the data pipe) thus defining a tree structure. Higher level listener functions requiring previously determined results are attached at a later position in the data pipe than the listener functions determining the results upon which they rely. A set of statistics provided by a set of listeners constitutes a project query and, in general, there may be a plurality of project queries 522. The definition of a project query is described with reference to FIG. 6.

In a preferred embodiment there is a standard set of listeners determining some commonly used statistical expressions, and provision for further, user-definable listeners. In a general case a listener computes a function or expression which depends upon one or more parameters, in this context termed "dimensions". A dimension or parameter may be itself comprise an expression.

In one embodiment dimensions include PDSN, cell (base station identity), BSC, PCF, MSC, source/destination address (internet destination website), subscriber (IMSI), session ID, downlink (DL)/uplink (UL), date and/or time (t) and expressions, for example t mod 3600 (i.e. time in hours), and session ID+10. Examples of statistics include most popular (mode), average (mean), last value, first value, count, count distinct (for example the number of distinct IMSIs or users, say per PDSM), some (for example total throughput per BSC) and the like. Listeners can also determine statistics such as throughput, for example TCP throughput, either by waiting for an end of session acknowledgment or by defining an arbitrary end point and then using a count of the number of packets transferred in a session to determine throughput. One or more listeners may also implement an event engine, that is a finite state machine which tracks the state of a call or network element by monitoring messages for signals indicating transitions between states, for example a transition between a dormant state (say with no RF link) and an operational state. Such a state machine may be constructed, for example, from a network specification since a state diagram is formally equivalent to a sequence diagram and information effectively defining such a diagram is published, for example, for the A10 and A11 interfaces in 3GPP2 A.S0017-A Version 2.0.1 (3G-105v.4.3) July 2003 Interoperability Specification (IOS) for cdma2000 Access Network Inferfaces—Part 7 (A10 and A11 Interfaces), hereby incorporated by reference. Alternatively such a state diagram may be constructed by monitoring transitions between states, that is events, which actually occur at a network interface or in a network element by reading captured messages. It will be appreciated that details of a state model may vary from operator to operator.

Figure 5D:
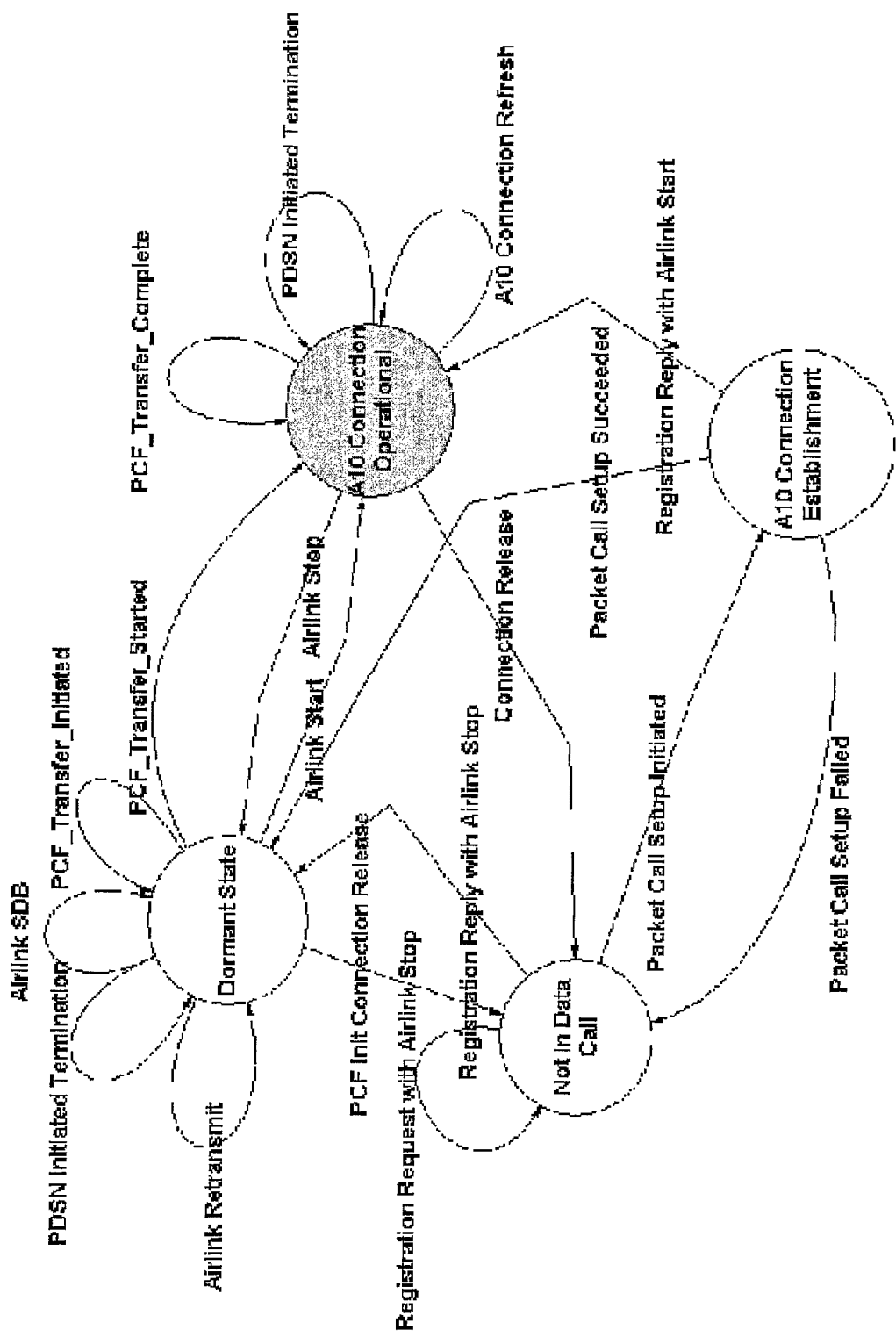

FIG. 5d shows an example of a state diagram for an A11 interface which, as the skilled person will understand, may be implemented by a finite state machine and tracked by an event engine listener to determine states of the interface which may then be used to generate statistics for analysis. Thus, for example, A11 states which may be detected include a Not in Data Call state, an A10 Connection Establishment, an A10 Connection Operational state, and a Dormant State. At this interface time stamped events which may be detected include signalling events such as Packet Call Set Up Initiated, Packet Call Set Up Failed, Packet Call Set Up Succeeded, and Connection Release as well as application events such as "user clicks on HTTP link" and "web page finished downloading". Statistics relating to these states and/or events may be captured as multi-dimensional data sets including, for example, percentage packet call set up failures, set up time distribution, and time to download web page statistics, broken down (or rolled up) by dimensions such as cell, PDSN, internet destination, subscriber, session and the like. At the A10/11 interface useful service statistics include average throughput, radio and core network RTT (round trip time) delay, and total traffic, and relevant dimensions for these include application, BSID, IMSI, PDSN, website, date and time. Likewise useful individual user statistics include access time, average throughput, total traffic, delay, and set up time, and relevant dimensions for these include IMSI, date and time. Useful per session statistics at the A10/11 interface include access time, average throughput, total traffic, set up time, average PPP throughput (uplink and downlink), average TCP throughput (uplink and downlink), and IMSI; and relevant dimensions for these include session, IMSI, date and time, and source address. Useful A10/A11 performance statistics include A10 peak throughput, A11 registration reply and update messages, abnormal mobile registrations, abnormal TTP events, and A10 LCP/IPCP (link control protocol/IP control protocol) configure code rejects, and relevant dimensions for these include BSID, IMSI, time/date, and session. Examples of other useful statistics and dimensions can be read from the screen shots of FIGS. 9 onwards.

As previously described the statistics generated by the project queries 522 are stored in database 212 in the form of two dimensional tables which can be visualised as storing n-dimensional data. FIG. 5e shows an example of such a table with two dimensions, from which it can be seen that the N statistics can be viewed according to either dimension (ruling up the other) or according to both dimensions. To facilitate drill-down to raw session data a session identifier may be included as a dimension and a session file name as a statistic.

The above described dimensions and statistics enable various approaches to network troubleshooting. At the user level embodiments of the system allow service problems to be dimensioned by user group or even individual users to categorise a problem. For example problems experienced by one user are likely to be due to equipment failures and/or improper configuration; problems experienced consistently by one group regardless of network equipment are probably related to equipment, configuration or application; and problems experienced by all users are probably related to a switch. When dimensioning by device type, problems experienced consistently by one device type and not others may be due to fundamental interoperability problems, configurations for manufacturing flaws whereas if a problem is experienced across all device types it is very unlikely that the device is the issue. When dimensioning by radio access network (RAN) parameters such as cell, BSC or PCF, problems experienced by a single cell or group of cells are likely to be hardware or radio environment related, but problems experienced across a single BSC or PCF but not others are likely to be due to configuration (for example buffering) or hardware issues for that BSC or PCF. When dimensioning by core network elements or internet destination embodiments of the system can be used to provide core network round trip delay and other TCP and session management statistics. In this context problems experienced consistently for one switch or one internet destination but not others are likely to be due to either configurations/hardware issues associated the switch or application server for configuration issues associated with the internet destination. Embodiments of the system enable drilling down into individual sessions to examine TCP and core network signalling messaging which can confirm core and IP problems. At the application level, statistics can be dimensioned by application (for example email, FTP, web access) and in this case problems associated with a single application are often indicative of application server problems. Again drilling down into individual sessions to examine TCP and application messaging can confirm this.

Figure 6:
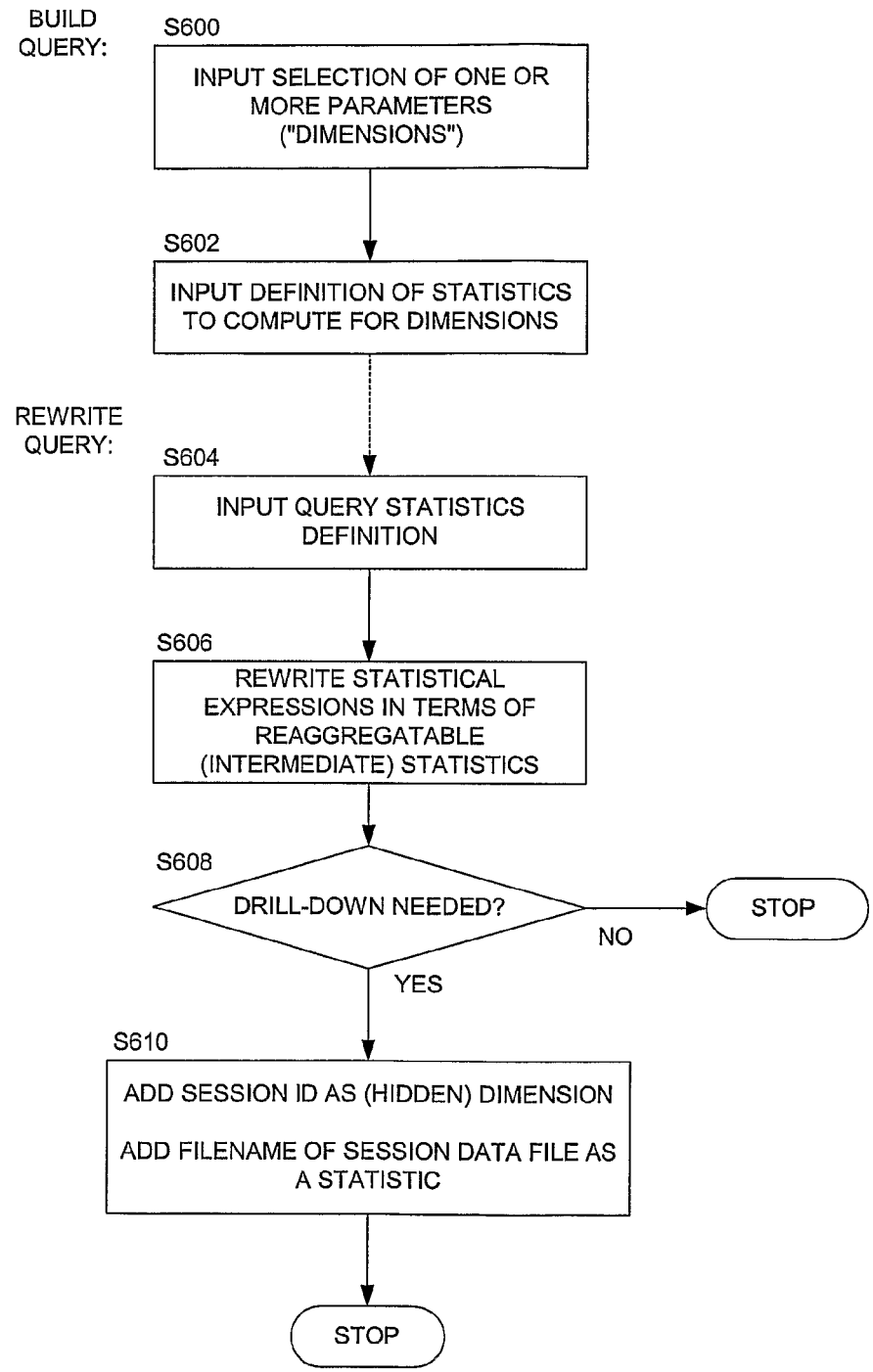
FIG. 6 shows a flow diagram of a query definition and re-writing procedure.

Referring now to FIG. 6, this shows a procedure for defining a query for implementation by a listener tree in the system of FIG. 5c. The procedure comprises two portions, one defining a query in terms of a set of dimensions, a second then re-writing the query to define re-aggregatable statistics to allow sets of statistics as shown in FIG. 5e to be combined. This re-writing is preferably invisible to a user of the system.

Thus, for example, a requirement for an average value is re-written as a requirement for a sum and a count so that two averages can be combined by adding the two sum values and adding the two count values and then dividing the total sum by the total count.

A requirement for a mode value is re-written as a requirement to store a set of values and a count for each, for example to determine the most popular IMSI on a particular PDSN a count of each IMSI is maintained. In this way two or more modes can be combined by summing the counts of each value to determine the most popular.

A requirement for a first (or last) value is re-written as a first (or last) value together with a time stamp so that when combining first (or last) values the earliest (or latest) value can be identified.

A requirement for a Count Distinct statistic is re-written in a similar way to a mode—that is the number of distinct occurrences of each value (for example distinct IMSIs or PDSNs) is stored together with the value. In this way the counts for each value can be combined when statistics are aggregated to determine a total number of distinct values.

Referring now to FIG. 6, this shows a procedure which may be implemented by the project definition module 216 of FIG. 2 to define a query 522 for a loading agent 210. Thus at step S600 a user (or another program) selects one or more parameters or dimensions and, and step S602, the procedure inputs a definition of statistics to compute for these dimensions. This defines a query from a user's perspective. However, the same or another programme module then receives this definition (S604) and re-writes statistical expressions as necessary, as described above, in terms of intermediate or re-aggregatable statistics (step S606). The procedure then determines whether drill-down is needed, for example by determining whether this has been requested (S608), if not the procedure ending. If drill-down is needed then, at step S610, the procedure adds the session identifier as a (in embodiments, hidden) dimension and adds the file name of a session data file as a statistic to the query definition (other embodiments of the system may employ other approaches to this, for example using a files table). Adding the session identifier as a dimension is useful because, for example, a single PDSN may have many associated communications sessions. As mentioned, a set of queries making up a project may be defined and such a set of queries defines a set of tables, for example of the type shown in FIG. 5e, which in turn defines a database schema. Generally such a schema will also include a number of standard tails such as a project name and identifier and a files table identifying files which have been successfully processed by splitter 206 (which information may be provided via a network connection from the splitter to the database).

Figure 7:
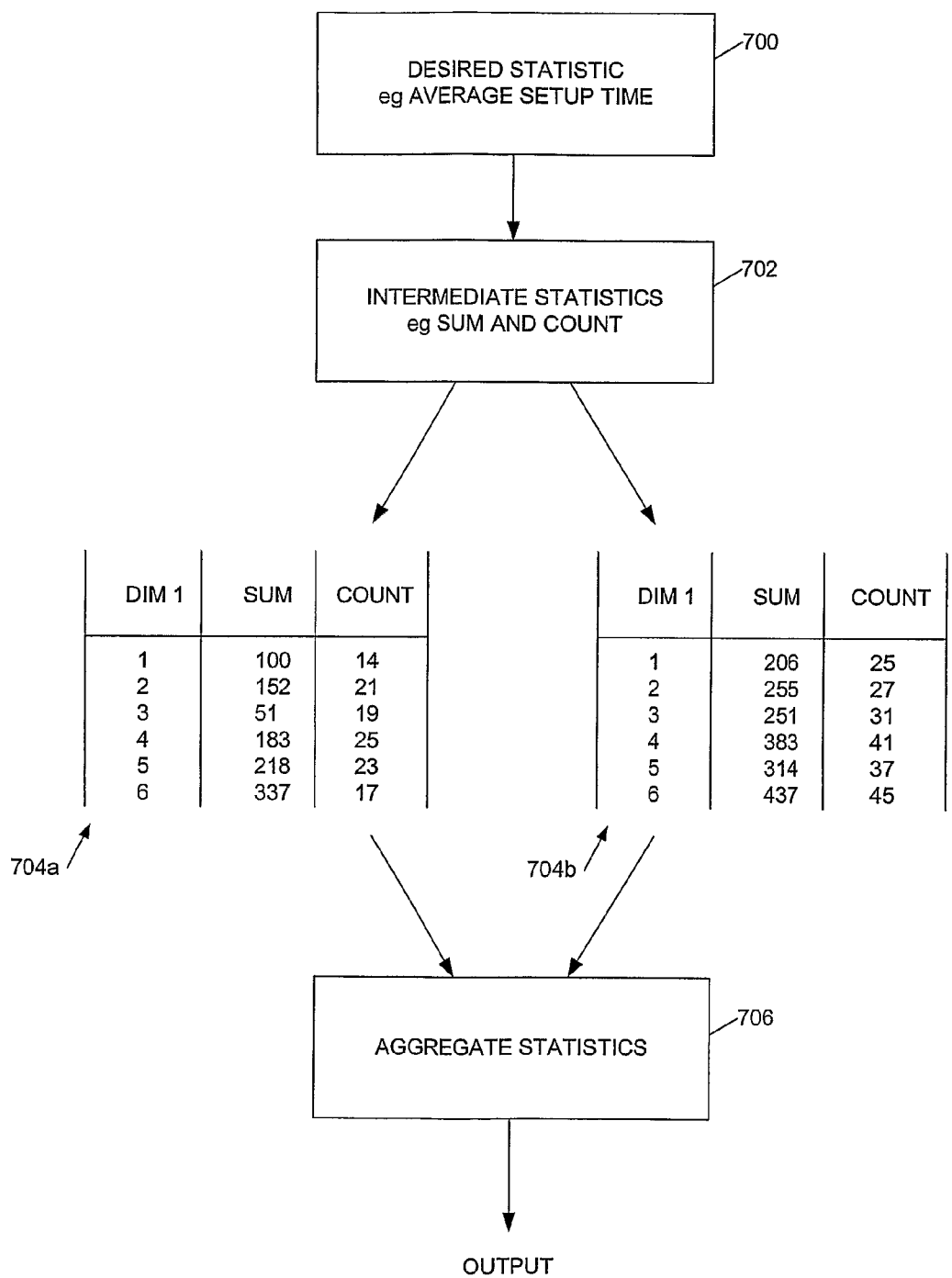
FIG. 7 shows an example of a statistic breakdown and re-aggregation procedure.

Referring next to FIG. 7, this shows how sets of statistics stored in tables in database 212 may be combined or aggregated. Such aggregation may take place within the table, for example when statistics for one or more dimensions of a table are rolled up and/or between tables, for example when combining data sets created at different times. Thus referring to FIG. 7 a query defines a desired statistic 700 such as an average setup time, and this is re-written in terms of intermediate statistics 702, in this case each average setup time being written as a sum (total time) of a number of setup times and a count of the number of setup times summed. Data are captured, for example, at two different times giving rise to tables 704a and 704b in database 212 which provide average setup time for, say, a number of different PDSNs. When these statistics are to be analysed data from the two tables 704a, b is combined or aggregated 706 to output an average setup time as desired. In the example of FIG. 7, for dimension 1 (say PDSN1) the total sum is 100+206=306 and the total count is 14+25=39 so that the average (setup time) is 7.8 mls.

The skilled person will recognise that once data have been collected in database 212 they may be analysed and displayed in many ways, for example in tabular form or graphically as pie or bar charts and the like. Thus the statistics explorer module 222 of FIG. 2 preferably provides a graphical user interface to database 212 and it preferably provided with a set of queries and dimensions from the project definition module 216 to allow a user to select a query and/or a pre-defined report to display. Preferably statistics are listed and may be ordered and/or filtered by dimension. Examples of this are described later. Report may be defined to identify or filter by particular events or conditions, for example to use a throughput query and/or a count of reject events to list, say, base stations behaving badly. Such report are preferably exportable in one or more formats, for example Microsoft Excel (trademark) format. Preferably the statistics explorer module 222 also enables a user to view raw session data, for example as a list of messages with details of a selective message, to facilitate identification of poor net performance for an individual user allowing examination of, say, setup of a TCP or IP link between network elements.

The statistics explorer module 222 may also be used to manually or automatically generate marketing and customer service related information. Thus the explorer module 222 may be configured to generate a list of one or more most popular websites or most used mobile stations, for example to assess the response to an advertising campaign. A customer service tool may be implemented by measuring statistics which correlate with user satisfaction such as throughput or data derived from network quality of service measurements. An alerting tool may also be implemented, for example for user virus detection based upon, say, websites address or other patterns of network usage or external site access. In general terms the capture of user traffic and signalling data allows the automatic generation of marketing information and reports based upon who is using the network and what use they are making of the network and of application accessed using the network, and also the automatic generation of customer service reports, for example identifying problems or potential issues relating to quality of service and related statistics. Moreover since raw session data is captured such reports can, if desired, provide information on what an individual user or a group of users is doing.

The skilled person will recognise that in addition to the above described examples of statistics stored in database 212 data derived from other sources may also be stored in the database and/or manipulated by loading agent listeners. Such information can include, for example, drive test information (which may be embedded in traffic—see WO 03/047280—hereby incorporated by reference), data from one or more mobile stations such as MS measurement data, and/or data from other sources. It will be appreciated that such data may be combined and manipulated in a similar way to other statistics.

Figure 8:
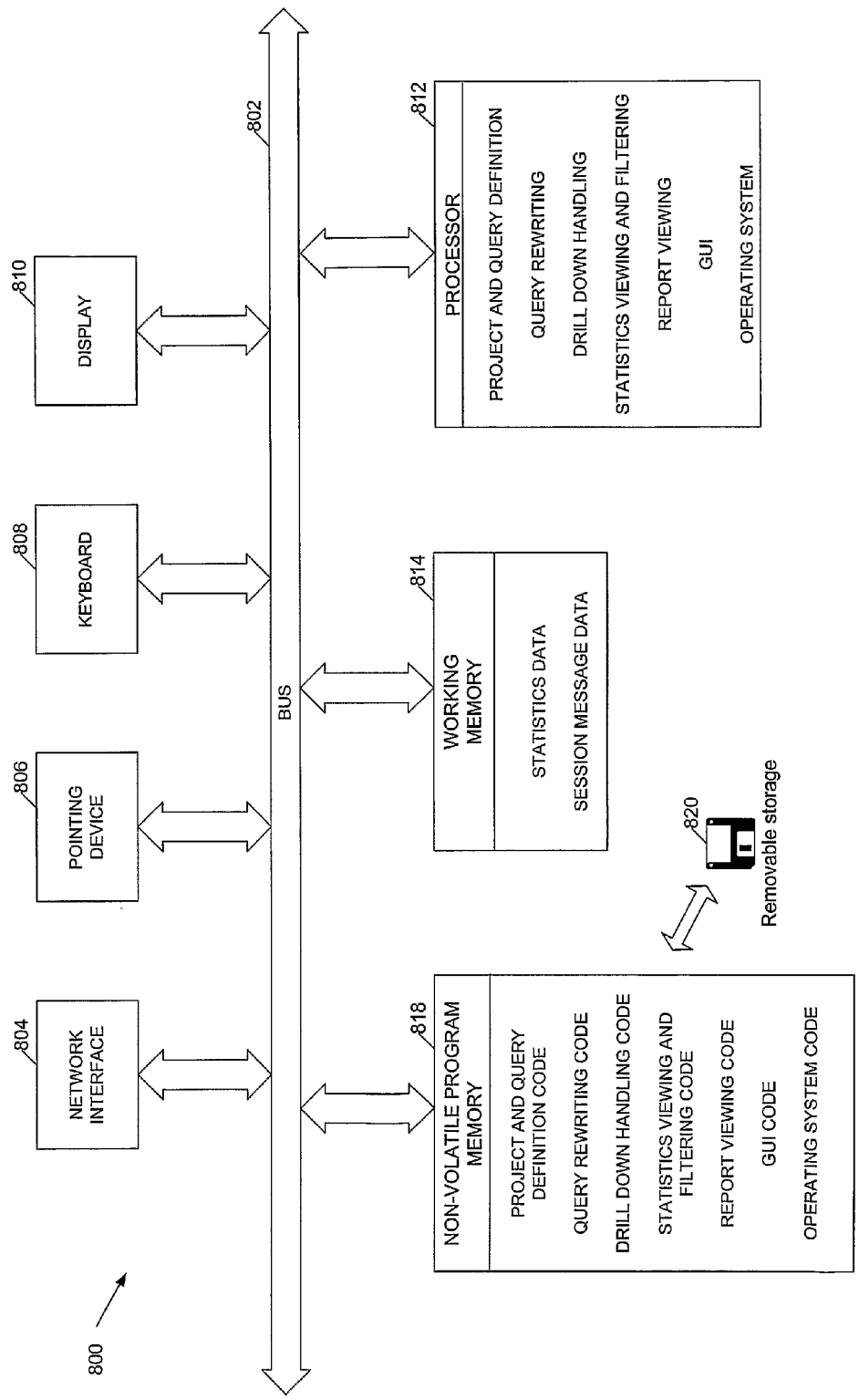
FIG. 8 shows a block diagram of a general purpose computer system suitable for implementing portions of the system of FIG. 2.

FIG. 8 shows block diagram of general purpose computer 800 system which may be employed to implement the project definition 216 and statistics explorer 222 modules of FIG. 2. These modules may be written in any conventional programming language, for example Visual C++. The computer comprises a data and address bus US802 to which are connected a network interface 804, a pointing device 806, a keyboard 808, and a display 810. Non volatile programming memory 818 stores project and query definition code, query re-writing code, drill-down handling code, statistics viewing and filtering code, report viewing code, GUI code, and operating system code, as described above, and a processor 812 loads and implements this code to provide corresponding functions.

Working memory 814 here stores statistics data and co-optionally, session message data. Some or all of the code in programme memory 818 may be provided on a removable storage medium 820 illustratively shown by a floppy disk. A similar computer system (but with no need for a pointing device, keyboard or display) may be used to implement a loading agent. Loading agent code may comprise session file reader code, protocol stack decoder code, and listener code to determine intermediate statistics and to write these into database 212 in accordance with one or more queries.

FIGS. 9 to 17 show screenshots illustrating ways in which the system may be used for troubleshooting and problem isolation.

Figure 9:
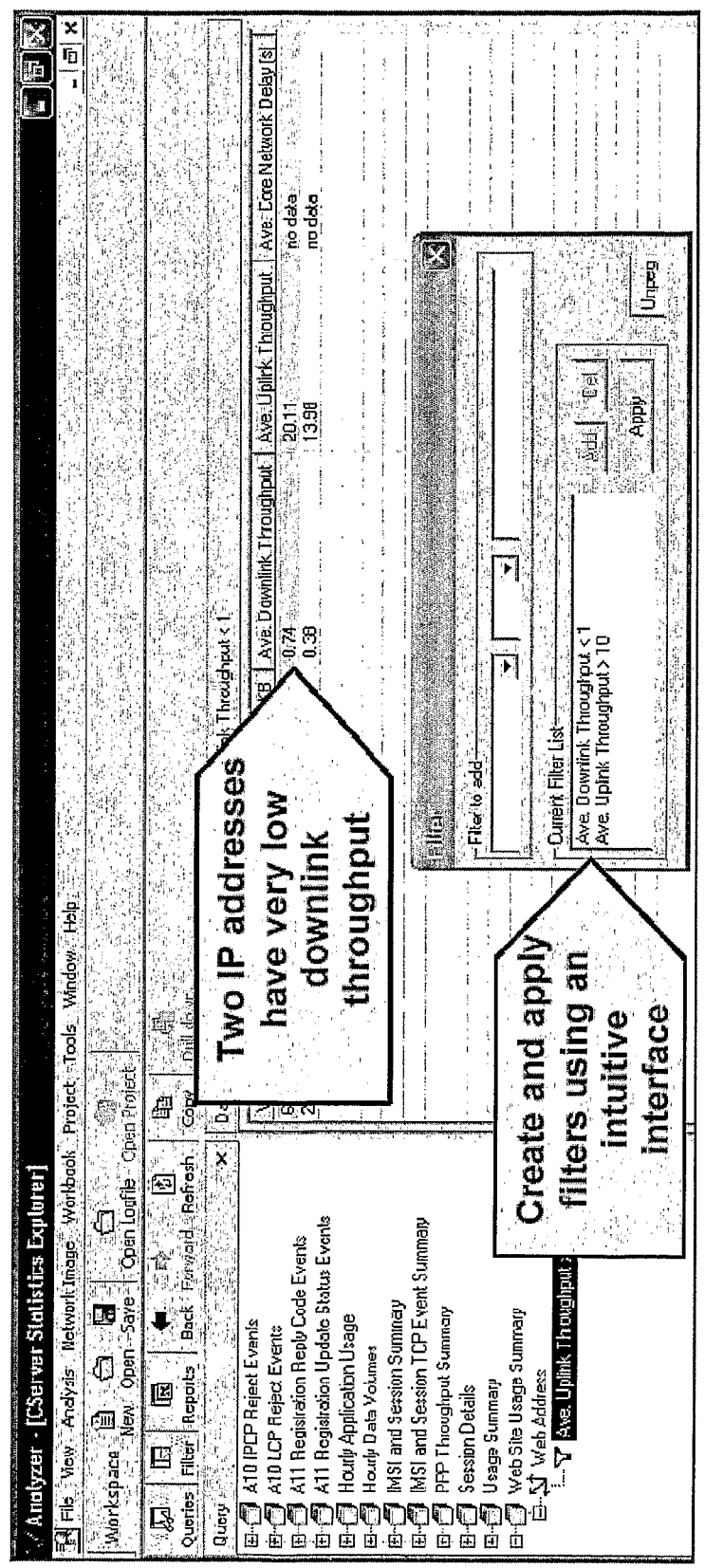
FIG. 9 shows an example of data filtering using the system of FIG. 2.
Figure 10:
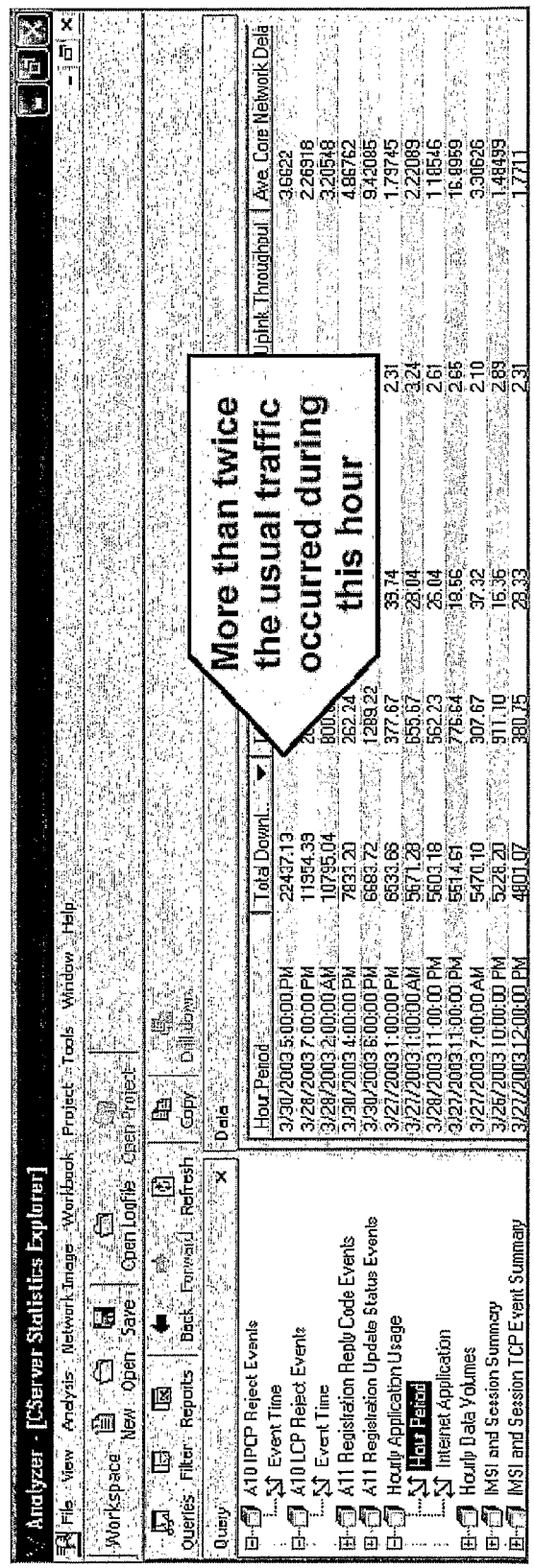
FIG. 10 shows an example of time-based network data analysis using the system of FIG. 2.
Figure 11:
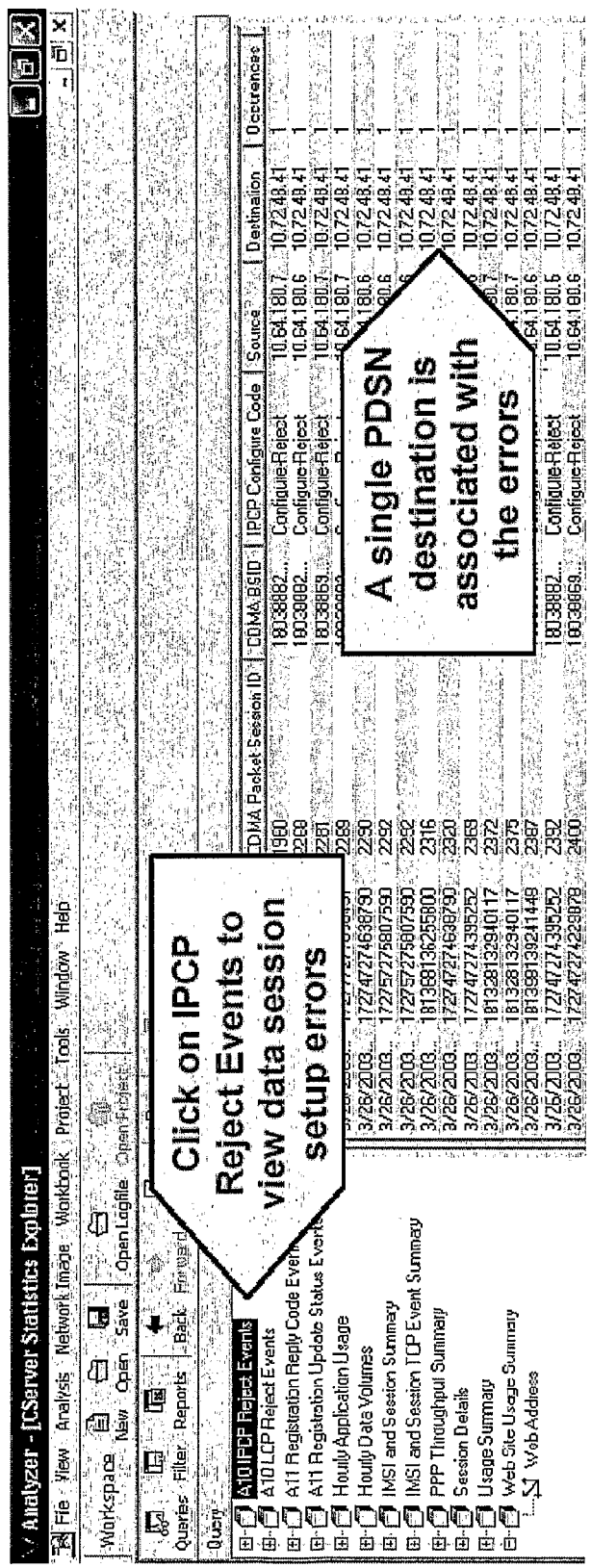
FIG. 11 shows an example of use of the system of FIG. 2 for analysing data session initialisation errors.

Some basic problems which may be quickly identified by reports include PDSN blocking due to overloading, as indicated by rejected data-session setup attempts, an application or contents server which is down, as indicated by abnormally low traffic to an internet destination (see FIG. 9), and application blocking and outages due to abnormally high traffic (see FIG. 10). FIG. 9 shows IP addresses with modest uplink throughput but very low or no downlink throughput, with the option of using a filter to select IP addresses with less than a threshold average downlink throughput. Reduced downlink throughput may indicate non-responsive servers or "down" servers. FIG. 10 shows hourly application usage split out by hour periods and sorted by total downlink traffic, showing a traffic spike comprising an hour during which more than twice the usual traffic occurred. Traffic spikes of this type may lead to blocking or outages. Statistical analysis can be used to determine whether problems are being experience by one or more cell fights or one or more PCFs or PDSMs, by many users or just one, across all applications or a subset, or across all destination IP addresses. A dimension analysis of this type can determine the likely location of a problem, for example isolating a problem to one of radio network element problems, core network problems, contents server problems, and internet problems. FIG. 11 shows a further example of analysis of this type, in which a report of A10 IPCP Reject Events is viewed to review error messages associated with initialising data sessions. In the example of FIG. 11 the destination PDSN is always the same across a number of different IMSIs and base stations and is thus the most likely cause of the problem.

FIG. 12 shows a report giving the time spent in each stage of setting up a data call, which can be used to identify network elements causing excessive connection times. The first stage in the connection process is generally the radio link origination and the radio link originations setup time is the amount of time it takes to obtain a signalling connection with the radio network. This can be automatically calculated by the system by examining the signalling between a mobile and a BTS. The PCF and PDSN then negotiate network resources for, in this example, the packet data call and the result of this is an A10 connection which can be used to establish an internet connection and to transfer application data. Again the system can automatically calculate the time it takes to obtain an A10 connection by examining the signalling between the PCF and PDSN. The network then establishes a PPP connection for the mobile for transferring data between the end user and the network, and again in preferred embodiments the system is able to determine the time taken to establish a PPP connection and, optionally, a duration of each step of the PPP setup process (authentication, ICMP, LCP and the like). Once network resources are allocated and a session has been established the mobile user is assigned a radio link data channel, and again the system is preferably able to automatically determine the time it takes to obtain such a data channel by examining the signalling between the BTS and the mobile. Once network resources have been allocated and the mobile has been assigned a data channel the mobile application is free to begin sending (or receiving) data and it is at this time that the user is considered "connected". The time at which the user is connected is also determinable by the system by examining radio link protocol (RLP) statistics and IP messaging available from the mobile device.

Embodiments of the system are also useful for radio network and end-to-end troubleshooting. For end-to-end testing the sniffer 202 may be configured to capture data for an entire PDSN location (one or more PDSNs) and data engineers may then perform tests such as sending and downloading MMS (multi media service) messages or the placement of PTT (press-to-talk) calls. This facilitates the identification of problems that include access failures due to poor radio coverage or interference, lost packets in the radio network or in the core network (by examining the frame error rate and lost packets on the core side to determine where packets are lost), buffering problems in a PCF or PDSN, and excessive radio network delay. FIG. 12 shows FER (frame error rate) data and other radio metrics which may be employed to determine causes of radio-related problems.

Packet loss can significantly degrade the throughput that the user experiences as lost packets are generally re-sent, sometime many times, by the network's RLP (radio link protocol) layer. Thus RLP statistics can be used to determine where excessive packet loss is occurring over a radio link and, say, to correlate this with other radio link statistics to further diagnose the problem. Preferably the system is able to use IP messaging (sequence numbers and the like) to identify missing packets on the radio access network and core network and, in some instances, to determine between which network elements a (voice or data) packet was lost. For example packet loss can be caused by network congestion resulting in buffering issues at a PDSN and/or PCF. FIG. 14 shows an example of a lost packet (and other TCP data) report by IMSI which may, for example, be correlated with network usage statistics to determine when network congestion may be causing problems. For example, network congestion may be determined by calculating the number of simultaneous sessions that are active on one or several PCFs or PDSNs or by calculating the relative percentage of traffic (bytes and sessions) that is being served by each server.

Figure 15A:
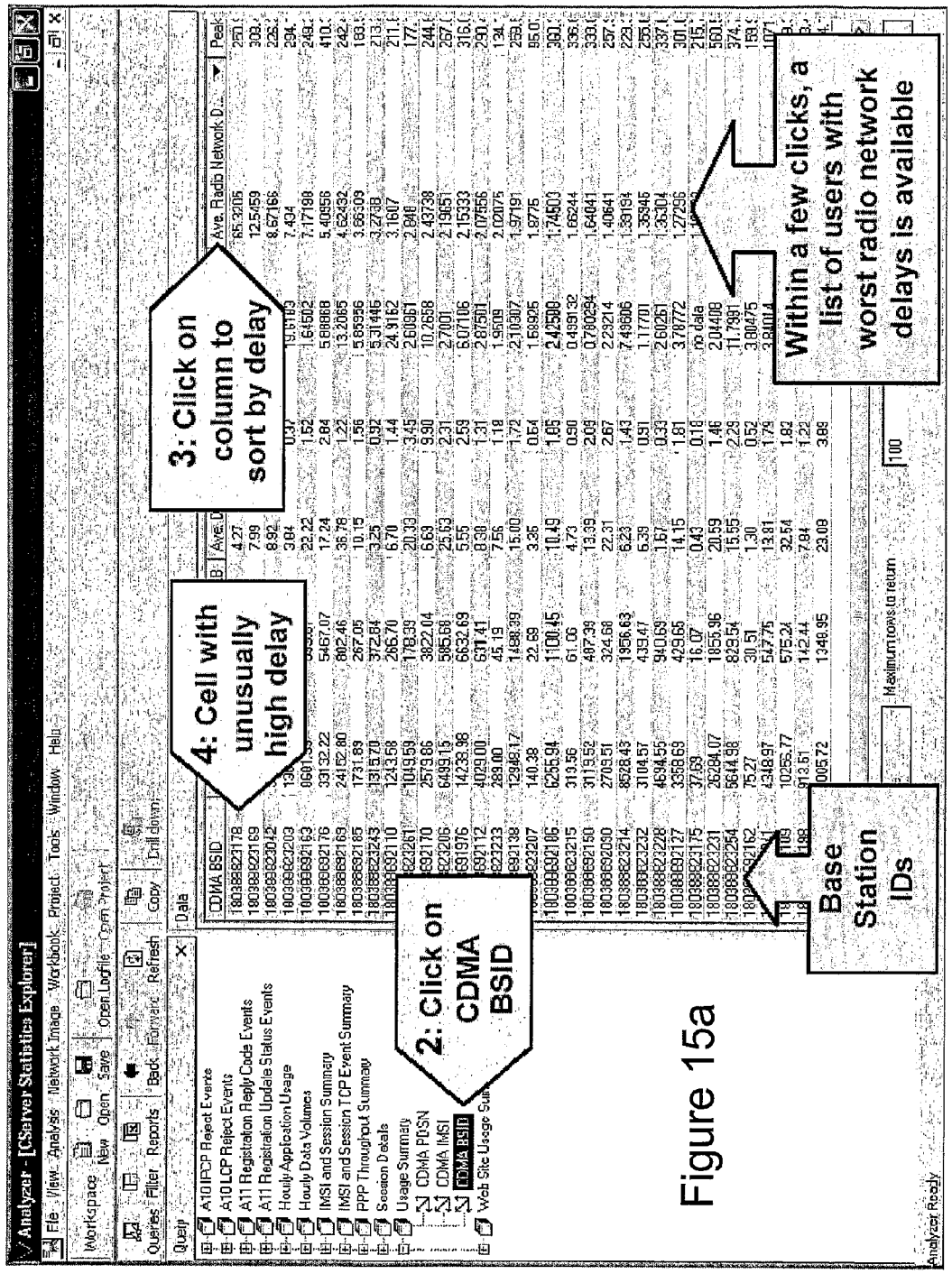
Figures 15B, 15C:
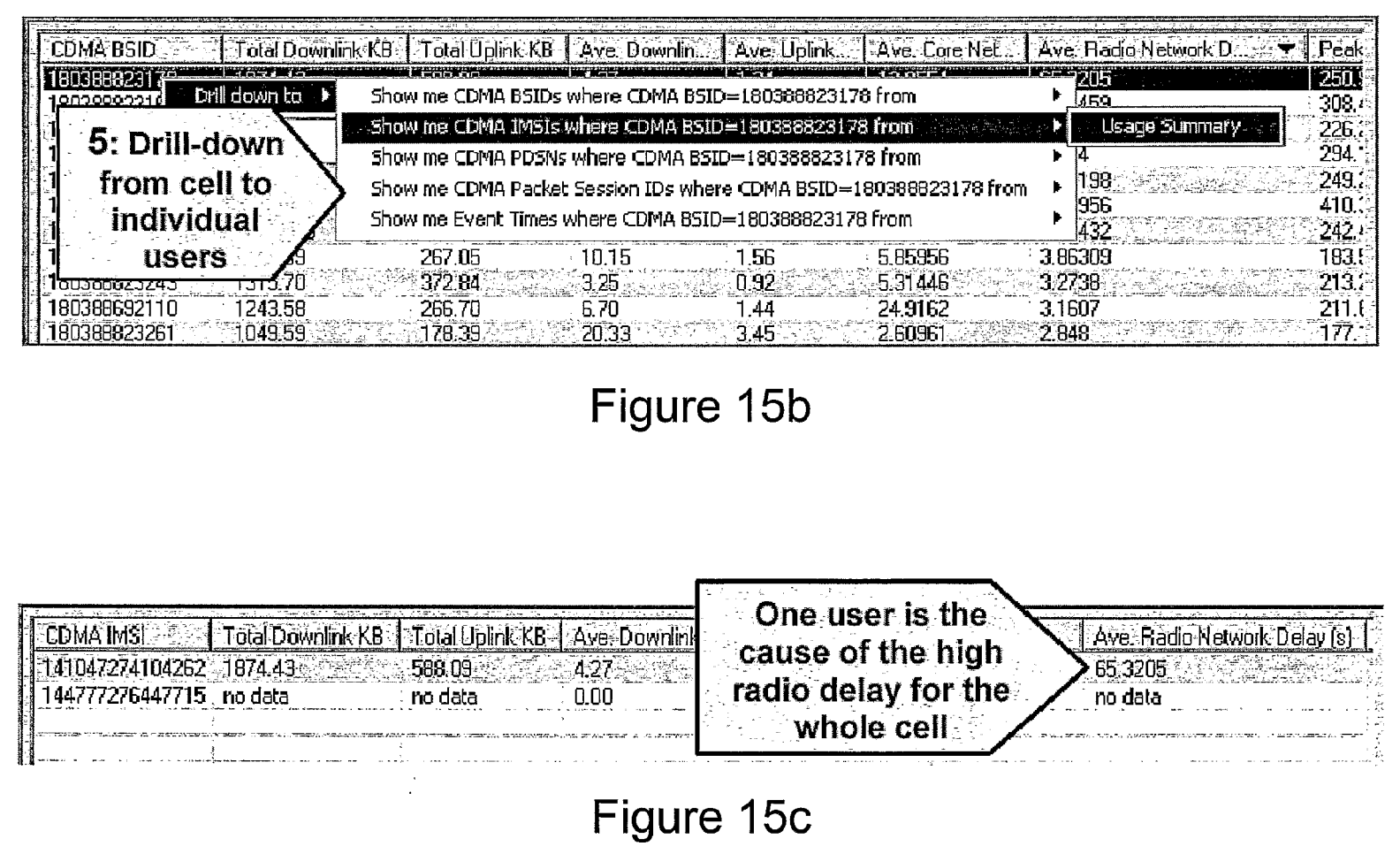

One measure of radio network delay is the time taken by a packet to transfer from a PDSN through the radio network and air interface to the mobile station and back again. Excessive radio network delay contributes directly to the overall delay experienced by a data service user and therefore directly impacts upon the reception of quality of service. FIG. 15a shows an example of data from a loading agent which was configured to continuously monitor all traffic at a PDSN location. Using the statistics explorer graphical user interface an engineer clicked on the CDMA BSID query under Usage Summary to show a set of statistics split out by base station. In FIG. 15A this was sorted by clicking on the average radio network delay column to create a list of base stations with the largest radio network delay and, in the illustrated example, identify one particular cell with an unusually high delay. In FIG. 15b a user has right-clicked on the row of statistics for this base station to open up the CDMA IMSI dimension to show individual users of the cell to further explore the radio network delay problem. FIG. 15c shows the result of this, which indicates that only two IMSIs were active during the relevant time period, one of which was responsible for the high delay for the cell. The data can then be further split out by individual sessions and sorted by radio delay, as shown in FIG. 15d which shows that some HTTP session have very high delays. Since the problem does not appear to occur on other cells a potential interference problem in part of the cell is indicated and this theory could be explored by drive testing or by speaking to the subscriber to determine whether problems are experienced consistently in one area.

Core network problems which may be rapidly identified by the system include abnormal data session setup times, PDSN blocking due to overloading indicated, for example, by rejected data session setup attempts, and internet congestion as indicated by, for example, excessively high round trip delay on the core network side. Excessive call setup time can be due to authentication or registration failure and FIG. 16 shows an example of a report relating failed authentication attempts. Network congestion/blocking, which can lead to denial of service, can be determined from statistics relating to the amount of traffic travelling between a PCF and a PDSN and/or the number of simultaneous sessions that are active on a PCF or PDSN, and/or the relative percentage of traffic (bites and/or sessions) that is handled by a PCF or PDSN. Other statistics can be employed to construct a list of PCFs and/or PDSNs that are available for packet data usage and then traffic for a specific period of time can be automatically evaluated against this list or against a user-defined list to determine when a server has not been used for a period, which can provide an indication that a server is down and requires attention.

FIGS. 17a and b show another example of use of the system to investigate excessive call setup time, in which a loading agent was configured to continuously monitor all traffic at a PDSN location. In FIG. 17a a user has viewed collected statistics by CDMA Packet Session ID and sorted the sessions by setup time to generate a list of users with the largest setup times. A data session with a high setup time (28 seconds in this example) is then selected and drill-down is requested to load detailed session messaging and detailed events and diagnostic attributes into the workspace, as shown by the left-hand pane in FIG. 17a. A protocol stack browser for the CDMA $A_{quater}$ data node is then selected to bring up the display of FIG. 17b, which shows that PPP connections are taking an unusually long time to complete LCP configuration negotiations due to a sluggish PDSN response. FIG. 17b shows message flows over the A10/11 interface and it can be seen that the PDSN takes more than 20 seconds to acknowledge an LCP configuration request and that when it does acknowledge and makes its own LCP request this is immediately rejected. (The lower pane in FIG. 17b shows details of highlighted message.) Having identified a potential problem the issue can then be addressed. FIG. 17c shows a further example of drill-down into details of individual message, in this case showing signalling messages from $G_b$ relating to radio link setup and establishment of a data session in a GPRS system.

Embodiments of the system have been mainly described with reference to a CDMA network but applications of the system are limited to this type of network. Thus systems similar to that described above may be employed in other mobile communications networks, including networks more frequently thought of as computer data networks, where these have communications sessions or calls which can be investigated by intercepting packets at an interface (internal or external) of the network. This might include, for example, VoIP (Voice over Internet Protocol) calls within a computer data network.

All rights including copyrights in the material contained in the screenshots, are vested in and the property of the assignee of the present invention. The assignee retains and reserves all rights in the screenshots, and grants permission to reproduce material only in connection with reproduction of the granted patent and for no other purpose.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of processing digital mobile phone network data for analysis, the method comprising:
   inputting network data captured from a digital mobile phone network, said network data comprising data for a plurality of communications sessions over said network, said network data including a plurality of session related parameters;
   inputting query data for one or more queries, a query defining a statistic relating to one or more of said parameters, to be computed from said network data;
   formatting a said query to define said statistic in terms of one or more intermediate statistics relating to said one or more parameters and to be computed from said network data, said statistic being computable from said one or more intermediate statistics;
   operating with said formatted query on said captured network data to determine said one or more intermediate statistics;
   providing said plurality of session related parameters to a data pipe configured to store a time-ordered series of sets of entries by storing said sets of entries at respective time positions of said data pipe, said data pipe comprising at each said time position a storage location allocated to each parameter of a set of expected parameters, said providing comprising writing session related parameters of a message into respective said storage locations corresponding to said session related parameters of said message;
   operating a first query by utilizing parameters at a first said time position on said data pipe;
   storing a result of said first query in an intermediate statistic storage location of said data pipe; and
   operating a second query by utilizing parameters at a second said time position on said data pipe later than said first position and by utilizing said stored result in the intermediate statistic storage location.

2. A method as claimed in claim 1 wherein said storing comprises storing said one or more intermediate statistics relating to said one or more parameters indexed by said one or more parameters.

3. A method as claimed in claim 1 wherein said storing comprises storing said one or more intermediate statistics indexed by an identifier of a said communications session.

4. A method as claimed in claim 1 wherein said intermediate statistics storage location comprises a database, the method further comprising determining a configuration for said database using said inputted query data.

5. A method as claimed in claim 1 further comprising analysing data in said data storeintermediate statistic storage location, said analysing comprising:
   inputting selection data defining selected ones of said one or more parameters;
   reading said one or more intermediate statistics for said related parameters; and
   determining at least one said statistic for said related parameters from said one or more intermediate statistics.

6. A method as claimed in claim 5 wherein said selection data comprises marketing or customer service report data.

7. A system for processing digital mobile phone network data for analysis, the system comprising:
   means for inputting network data captured from a digital mobile phone network, said network data comprising data for a plurality of communications sessions over said network, said network data including a plurality of session related parameters;
   means for inputting query data for one or more queries, a query defining a statistic relating to one or more of said parameters, to be computed from said network data;
   means for formatting a said query to define said statistic in terms of one or more intermediate statistics relating to said one or more parameters and to be computed from said network data, said statistic being computable from said one or more intermediate statistics;
   means for operating with said formatted query on said captured network data to determine said one or more intermediate statistics;
   means for providing said plurality of session related parameters to a data pipe configured to store a time-ordered series of sets of entries by storing said sets of entries at respective time positions of said data pipe, said data pipe comprising at each said time position a storage location allocated to each parameter of a set of expected parameters, said providing comprising writing session related parameters of a message into respective said storage locations corresponding to said session related parameters of said message;
   means for operating a first query by utilizing parameters at a first said time position on said data pipe;
   means for storing a result of said first query in an intermediate statistic storage location of said data pipe; and
   means for operating a second query by utilizing parameters at a second said time position on said data pipe later than said first position and by utilizing said stored result in the intermediate statistic storage location.

8. A method of processing digital mobile phone network data for analysis, the method comprising:
   inputting network data captured from a digital mobile phone network, said network data comprising data for a plurality of communications sessions over said network, said network data including a plurality of session related parameters;
   dividing said captured network data into a plurality of data structures, one for each said communications session;
   processing said divided data in accordance with one or more queries to generate statistical data for each of a plurality of said sessions, said query defining at least one statistic relating to one or more said parameters;
   storing, in a data store, said statistical data for each of said sessions in association with a session identifier;
   wherein network data for a session used to generate said statistical data is retrievable, the method further comprising:
   providing said plurality of session related parameters to a data pipe configured to store a time-ordered series of sets of entries by storing said sets of entries at respective time positions of said data pipe, said data pipe comprising at each said time position a storage location allocated to each parameter of a set of expected parameters, said providing comprising writing session related parameters of a message into respective said storage locations corresponding to said session related parameters of said message;

operating a first query by utilizing parameters at a first said time position on said data pipe;

storing a result of said first query in an intermediate statistic storage location of said data pipe; and operating a second query by utilizing parameters at a second said time position on said data pipe later than said first position and by utilizing said stored result in the intermediate statistic storage location.

9. A method as claimed in claim 8 wherein said statistical data comprises statistical data aggregatable to provide said at least one statistic for a combination of two or more said sessions.

10. A method as claimed in claim 8 wherein said processing comprises operating on each said data structure to generate said statistical data.

11. A method as claimed in claim 8 wherein said storing in said data store comprises storing indexed by one or more of said parameters.

12. A method as claimed in claim 8 wherein said processing is performed in parallel for said plurality of data structures.

13. A system for processing digital mobile phone network data for analysis, the system comprising:

means for inputting network data captured from a digital mobile phone network, said network data comprising data for a plurality of communications sessions over said network, said network data including a plurality of session related parameters;

means for dividing said captured network data into a plurality of data structures, one for each said communications session;

means for processing said divided data in accordance with one or more queries to generate statistical data for each of a plurality of said sessions, a said query defining at least one statistic relating to one or more of said parameters; and means for storing, in a data store, said statistical data for each of said sessions in association with a session identifier;

wherein network data for a session used to generate said statistical data is retrievable, the system further comprising:

means for providing said plurality of session related parameters to a data pipe configured to store a time-ordered series of sets of entries by storing said sets of entries at respective time positions of said data pipe, said data pipe comprising at each said time position a storage location allocated to each parameter of a set of expected parameters, said providing comprising writing session related parameters of a message into respective said storage locations corresponding to said session related parameters of said message;

means for operating a first query by utilizing parameters at a first said time position on said data pipe;

means for storing a result of said first query said an intermediate statistic storage location of said data pipe; and means for operating a second query by utilizing parameters at a second said time position on said data pipe later than said first position and by reading utilizing said stored result in the intermediate statistic storage location.

14. A system as claimed in claim 13 wherein said statistical data comprises data for intermediate statistics, said system further comprising:

means for inputting query data defining said one or more queries;

means for formatting a said query to define a said statistic in terms of one or more intermediate statistics relating to said one or more parameters and to be computed from said network data, said statistic being computable from one or more sets of said one or more intermediate statistics;

means for operating with said formatted query on said captured network data to determine said one or more intermediate statistics; and means for storing said intermediate statistics in said data store for analysis.

15. A system as claimed in claim 13 further comprising a plurality of processors, each said data structure having an associated processor to perform said processing and to send said statistical data for a session over a network to said data store.

* * * * *